United States Patent [19]

Bijnagte

[11] Patent Number: 5,146,548
[45] Date of Patent: Sep. 8, 1992

[54] METHOD AND APPARATUS FOR OPTIMIZING AND STORING CONTONE IMAGES FOR SUBSEQUENT HALF-TONING AND MERGING WITH TEXT

[75] Inventor: Leendert M. Bijnagte, Minneapolis, Minn.

[73] Assignee: Moore Business Forms, Inc., Grand Island, N.Y.

[21] Appl. No.: 569,388

[22] Filed: Aug. 15, 1990

Related U.S. Application Data

[63] Continuation of Ser. No. 211,054, Jun. 24, 1988, abandoned.

[51] Int. Cl.⁵ .................. G06F 3/12; G06F 15/68; H04N 1/387
[52] U.S. Cl. .................. 395/117; 395/147; 395/115; 358/455; 358/461
[58] Field of Search .............. 358/453, 455, 456, 458, 358/461; 382/54, 51; 364/523, 519, 518; 395/117, 115, 147, 145, 132

[56] References Cited

U.S. PATENT DOCUMENTS

| | | | |
|---|---|---|---|
| 4,411,015 | 10/1983 | Scherl et al. | 382/51 |
| 4,485,454 | 11/1984 | Kimoto | 364/900 |
| 4,504,972 | 3/1985 | Scherl et al. | 382/51 |
| 4,532,554 | 7/1985 | Skala | 358/257 |
| 4,577,235 | 3/1986 | Kannapell et al. | 358/462 |
| 4,614,977 | 9/1986 | Kawahara et al. | 358/428 |
| 4,635,136 | 1/1987 | Ciampa et al. | 358/342 |
| 4,636,845 | 1/1987 | Alkofer | 358/80 |
| 4,668,995 | 5/1987 | Chen et al. | 358/459 |
| 4,675,743 | 6/1987 | Riseman et al. | 358/467 |
| 4,803,643 | 2/1989 | Hickey | 364/523 |
| 4,816,911 | 3/1989 | Kirsch et al. | 358/256 |
| 4,933,880 | 6/1990 | Borgendale et al. | 364/523 |

OTHER PUBLICATIONS

"Thousands of Homes Land on a Videodisc", *Miami Herald*, Jun. 15, 1987, p. s;171. (Dialog Abstract).
"Boris Adds Imaging Options to System", *MIS Week*, Jan. 2, 1985, p. 25. (Dialog Abstract).
0155977, Dateline: Nashua, N.H. Apr. 1987, ImagiTex Inc. Announces "Picture Palette" Image Processing Software.
0153538, Dateline: New Haven, Conn,, Feb. 1987, Cyber Research Inc., Photographic Equivalent Images Created by PC Based Desktop Publishing Software.
0171136, Dateline: Mountain View, Calif., Oct. 1987, Datacopy Corp., Macimage Scanning Software Adds Comprehensive Grayscale Capabilities for Photo Reproduction.
0117240, Dateline: Huntsville, Ala., Jun. 1985, Intergraph Corp. Signs OEM Agreement for ImagiTex Scanning System.
0115475, Dateline: Washington, D.C., Oct. 1985, Xyvision's unique Xygraphix software makes graphics editing easy.
0133446, Dateline: Mountain View, Calif., Jul. 1986, Datacopy Introduces Intelligent Imaging Subsystem.
0113856, Dateline: Huntsville, Ala., Sep. 1985, Integraph Corporation Announces Additional Technical Publishing Software.
0109708, Dateline: Hopkinton, Mass., Mar. 1985, Royce Image Composer First System to Generate 110–Line Screen Halftone with Autologic Phototypesetter.
0174953, Dateline: Edmonds, Wash., Nov. 1987, Scenicwriter Now Includes Complete Image Processing.

*Primary Examiner*—Gary V. Harkcom
*Assistant Examiner*—Raymond J. Bayerl
*Attorney, Agent, or Firm*—Nixon & Vanderhye

[57] ABSTRACT

In publishing listings of real estate properties, photographed (or videotaped) images are converted to digital graphics at the "front end" of the publishing process. This image conversion ("capture") process includes cropping, contrast adjustment using statistical techniques, and generation of control information needed later in the process. A library of digital graphics and associated information is maintained. Graphics selected from this library and a conventional "multiple listing service" text database are then merged during a text composition process to provide a stream of digital data including text and embedded graphics to be printed in the listing book. Because all image operations (e.g., sizing, cropping, and digital image quality enhancement) are performed when the images are captured, no time consuming post processing steps are requird. Image capture is performed in a single step, and once an image is captured it can be used "as is" in the printing process without further review, modification or post processing.

28 Claims, 12 Drawing Sheets

MASS STORAGE

METHOD AND APPARATUS FOR OPTIMIZING AND STORING CONTONE IMAGES FOR SUBSEQUENT HALF-TONING AND MERGING WITH TEXT

This is a continuation of application Ser. No. 07/211,054, filed Jun. 24, 1988, now abandoned.

CROSS REFERENCE TO RELATED APPLICATION

This application is related to copending commonly assigned application serial number 757,959 filed Sep. 17, 1991 in the name of Bijnagte entitled "APPARATUS AND METHOD FOR COMMUNICATING TEXTUAL AND IMAGE INFORMATION BETWEEN A HOST COMPUTER AND A REMOTE DISPLAY TERMINAL."

FIELD OF THE INVENTION

This invention generally relates to digitization of images. The invention more particularly relates to digitizing photographic images, merging the resulting digital image information with text information, and printing the merged image and text information. Still more particularly, the present invention relates to preparing and printing "multiple listing service" real estate listing booklets and similar printed matter (e.g., advertisements, magazine copy, etc.) using data processing techniques to generate and integrate digitized images with digital text information.

The process of producing real estate "multiple listing service" ("MLS") "books" has always been a labor-intensive and expensive process. Such books contain listings of all real estate properties listed for sale in a given geographical area by member real estate brokers, and are used by real estate agents to locate properties that fit the needs of their clients. Such books reflect the properties currently on the market, and must therefore be printed relatively often (e.g., once a week in many areas).

A large percentage of the listings in one such book are generally identical to the listings in the previous version of that book (since properties are typically listed for sale in the book until they are sold). In addition, new listings may have to be inserted between older listings—requiring the entire book to be reorganized and repaginated for each printing. For these and other reasons, automated typesetter/word processing workstations have been used for many years to compose, format (and reorganize and edit) the text appearing on the pages of real estate listing books.

While textual information in real estate listing books provides a lot of information to a prospective buyer about a particular property, real estate agents have long known that the efficiency of their sales efforts increases dramatically if they can show the buyer photographs of the properties in addition to the text. Buyers often have strong preferences for certain architectural styles and property outward appearances. Allowing a buyer to pre-screen properties by viewing photographs printed in the listing book (or using the computerized PHOTO-TRIEVE system available from Moore Data Management Services Division) saves the buyer and the real estate agent countless hours of travelling to and inspecting properties that could be eliminated from consideration by simply viewing photographs of the property.

In the prior art, photographs are added to listing book copy by printing the composed textual information (in which space is reserved for photographs) and using conventional paste-up techniques to physically adhere actual photographs of the properties to the copy. The copy with photographs added is then processed using conventional photo lithography and printing techniques. Needless to say, this overall process is extremely tedious and labor-intensive, and has other disadvantages as well.

For example, the organization, order and pagination of the written copy typically changes each time a new version of the listing book is composed (because new listings are typically inserted between older listings and some listings are typically deleted). Consequently, the hard copy of the previous book must be discarded. It is, however, cost prohibitive (and an organizational nightmare) to photographically print new photographs for all of the listings in the new version. Copy artists must therefore remove photographs from the old copy and paste them onto the new copy at the proper positions. Mistakes can easily be made mismatching photographs and listings during the paste-up process (even though each photo is usually labelled on the back with a listing number and/or other designation)—causing the book to be printed with text information describing one property and a photo of an entirely different property. The photographs are sometimes also torn or damaged during removal and subsequent paste-up—requiring the darkroom to reprint photos on a rush basis (assuming the proper negatives can be located).

Another very significant problem with the paste-up techniques used in the prior art relates to the image quality and consistency in the printed product. Photographs of different properties are generally shot by different people (with disparate levels of experience as photographers) using different equipment and film. Consequently, the photographs of the various properties often have too much or too little contrast, may be under-exposed or overexposed, and may be poorly composed and framed. Since washed out or contrasty photos (and poorly framed photos) of properties in the listing book may cause agents and prospective buyers to overlook properties they might otherwise be interested in, it is important for all photographs to be of acceptable quality. Moreover, image quality consistency is an extremely desirable goal, since it improves the overall appearance and "readability" of the listing book. In the past, desired quality and consistency of the images printed in the listing book was obtained only through use of expensive and time-consuming photograph processing services involving custom cropping and printing techniques.

The present invention solves many or all of these problems by converting photographed (or videotaped) images to digital graphics at the "front end" of the publishing process. This image conversion ("capture") process includes cropping, contrast adjustment using statistical techniques, and generation of control information needed later in the process. A library of digital graphics and associated information is maintained. Graphics selected from this library and a conventional "multiple listing service" text database are then merged during a text composition process to provide a stream of digital data including all of the information (text as well as embedded graphics) to be printed in the listing book. Because all image operations (e.g., sizing, cropping, and even digital image quality enhancement) are performed when the images are captured, no time consuming post processing steps are required. That is, image capture is performed in a single step, and once an image is captured it can be used "as is" without further review, modification or post processing.

These and other features and advantages of the invention will be better understood by studying the following detailed description of presently preferred exemplary embodiments in conjunction with the appended sheets of drawings of which:

FIG. 4 is a flow chart of the "obtain new graphics" block shown in FIG. 2;

Figure 6:
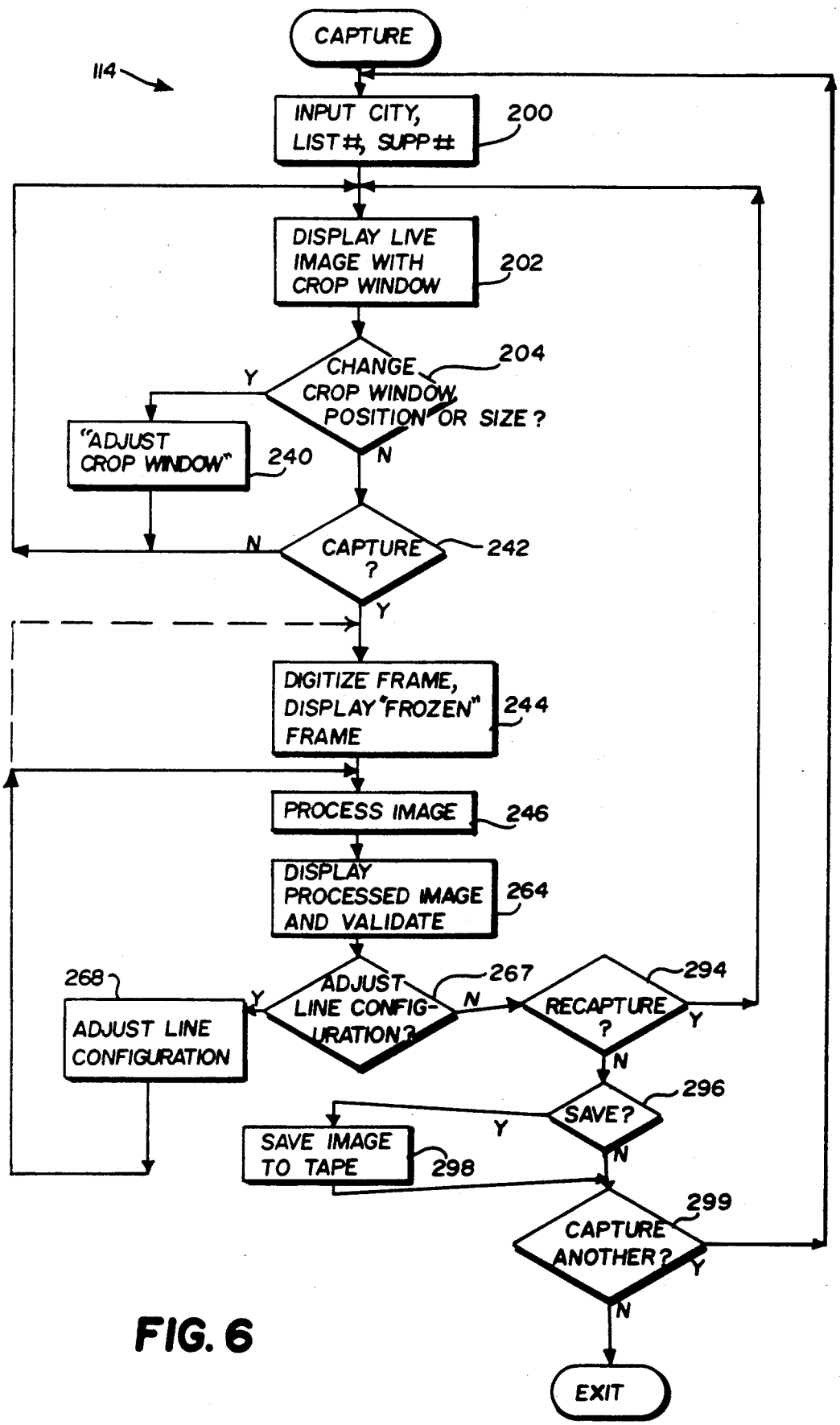
FIG. 6 is a more detailed chart of exemplary program control steps performing the "capture image" block shown in FIG. 4.
Figure 8:
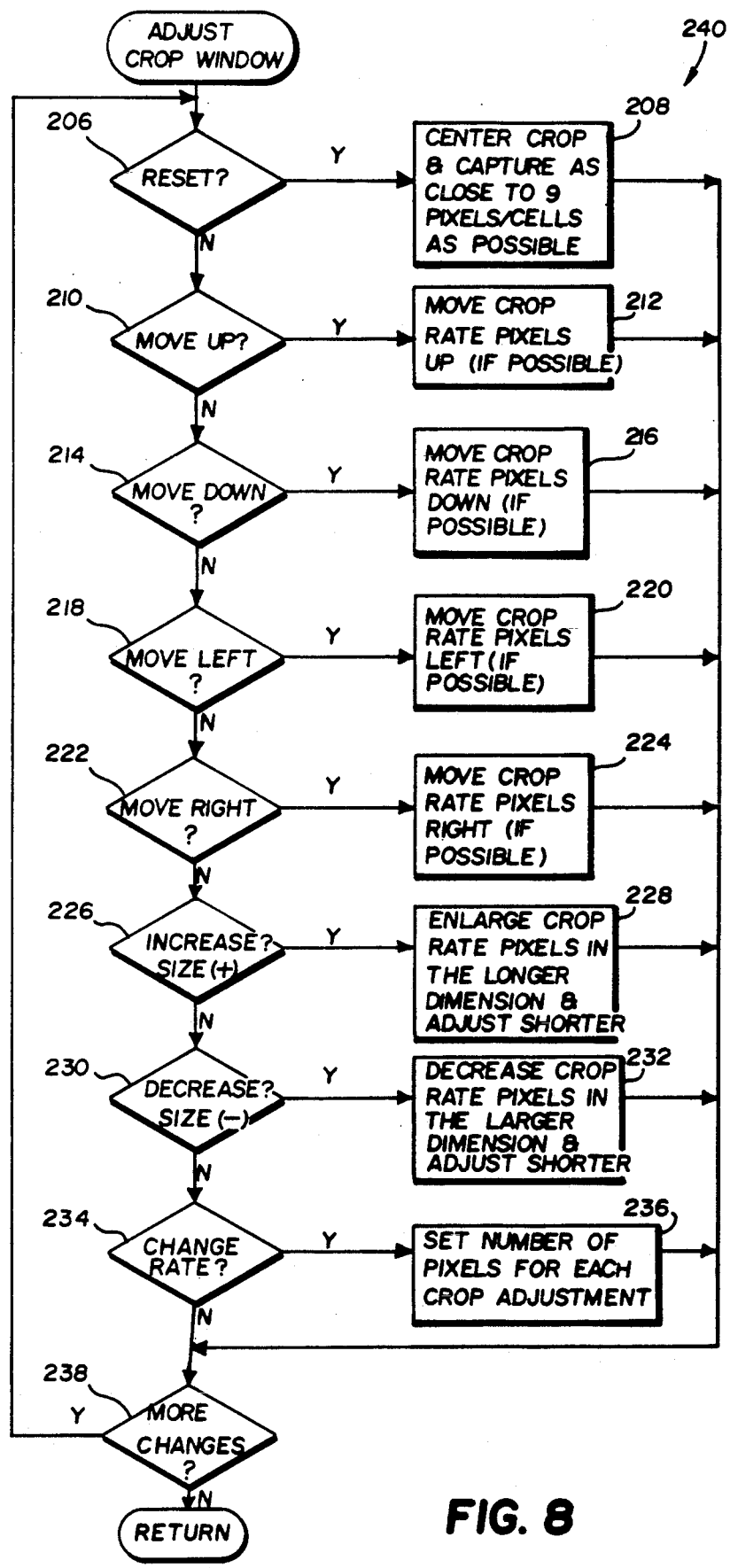
FIG. 8 is a detailed flow chart of the "adjust crop window" shown in FIG. 6.
Figure 9:
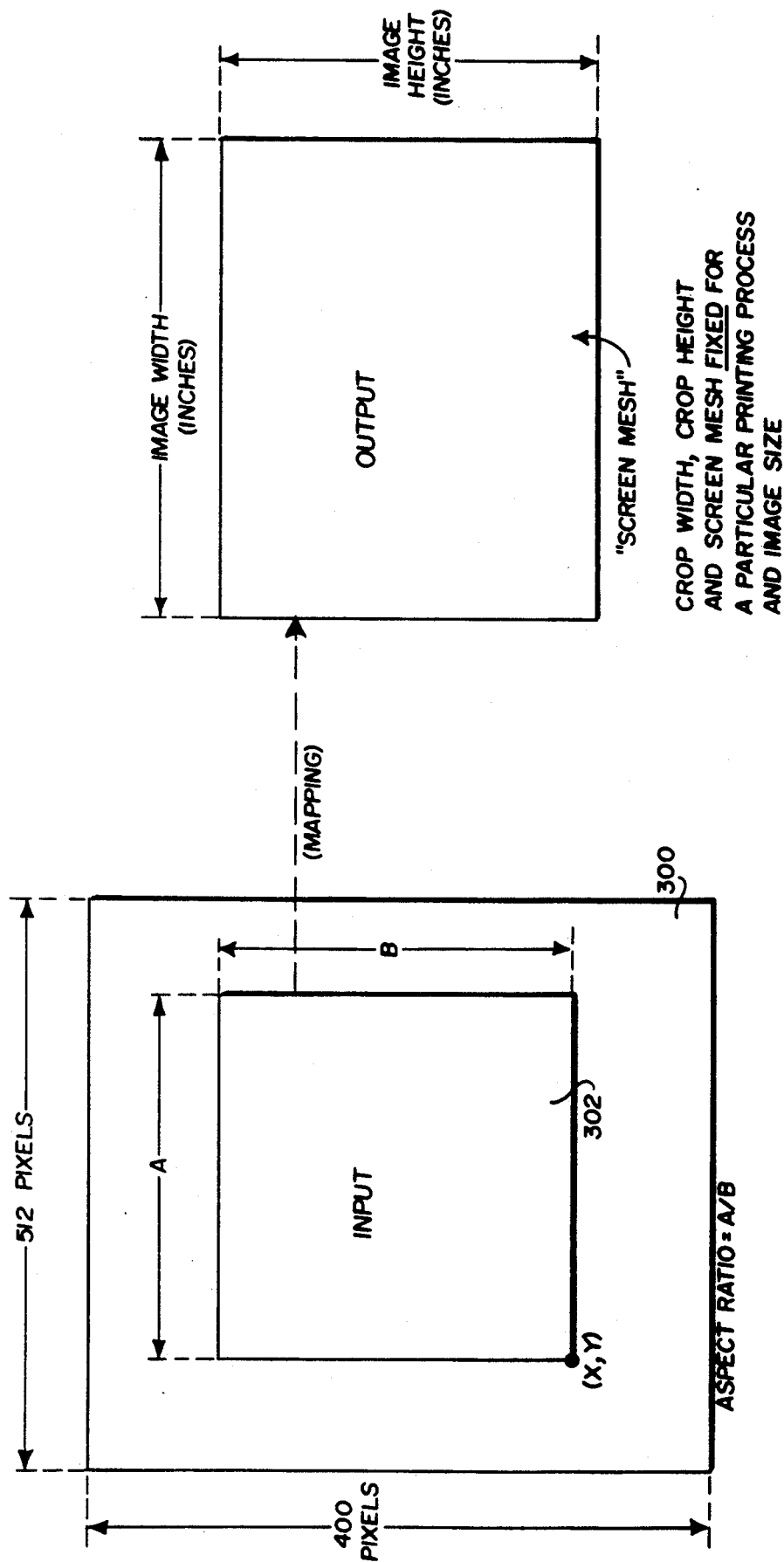
Figure 10:
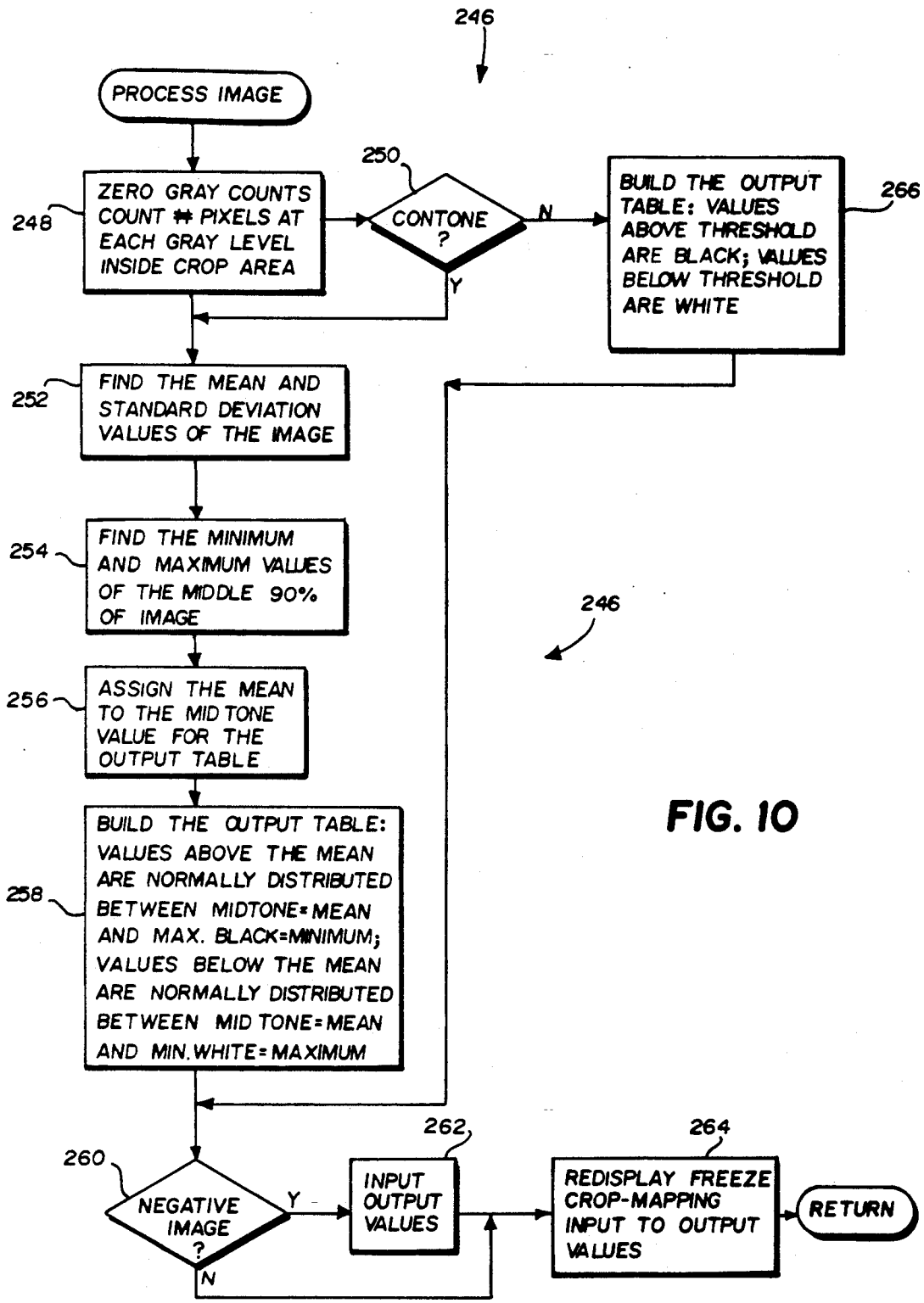
Figure 11:
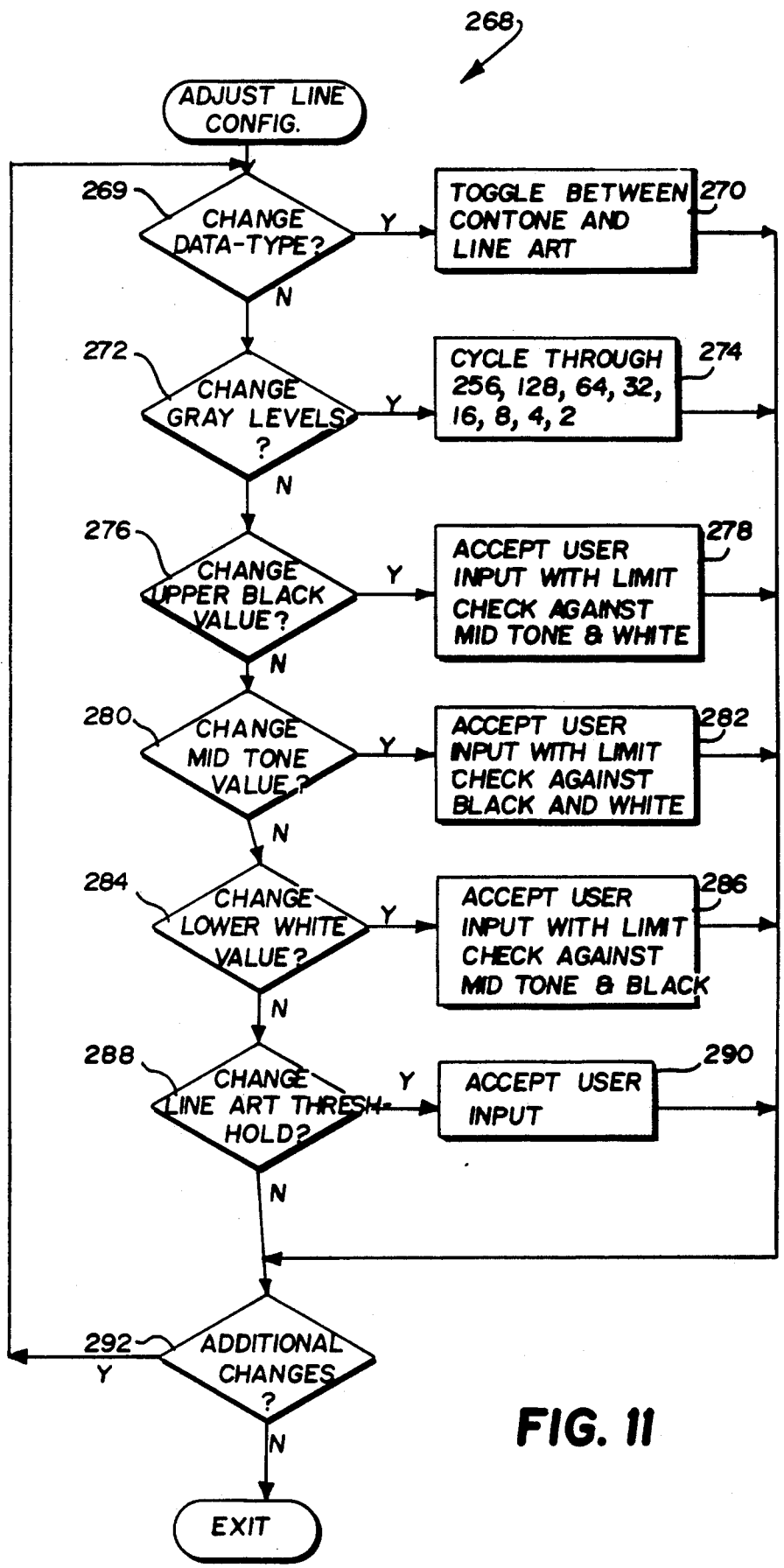
Figure 12:
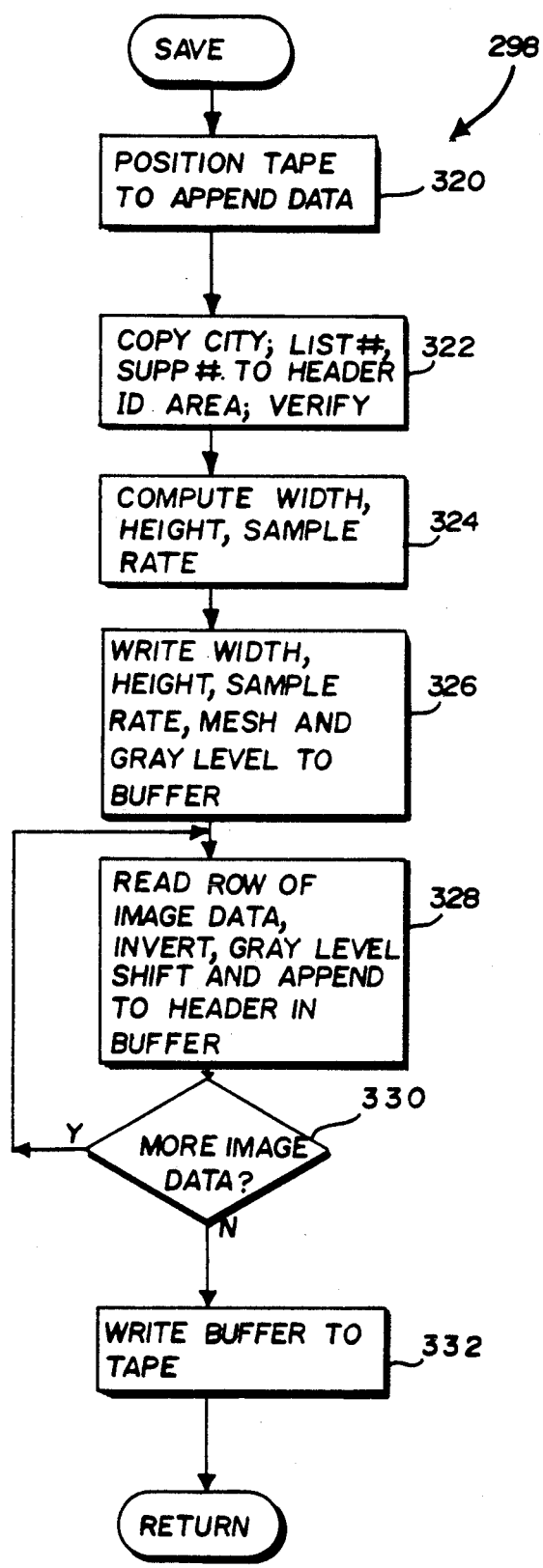

FIGS. 9A and 9B schematically illustrate the mapping of input pixels to output dots in accordance with the crop window established by the steps shown in FIG. 8;

FIG. 10 is a flow chart of the "process image" block shown in FIG. 6;

FIG. 11 is a flow chart of the "adjust line configuration" block shown in FIG. 6; and FIG. 12 is a flow chart of the "save image" block shown in FIG. 6.

EXEMPLARY GRAPHICS CAPTURE SYSTEM

Figure 1:
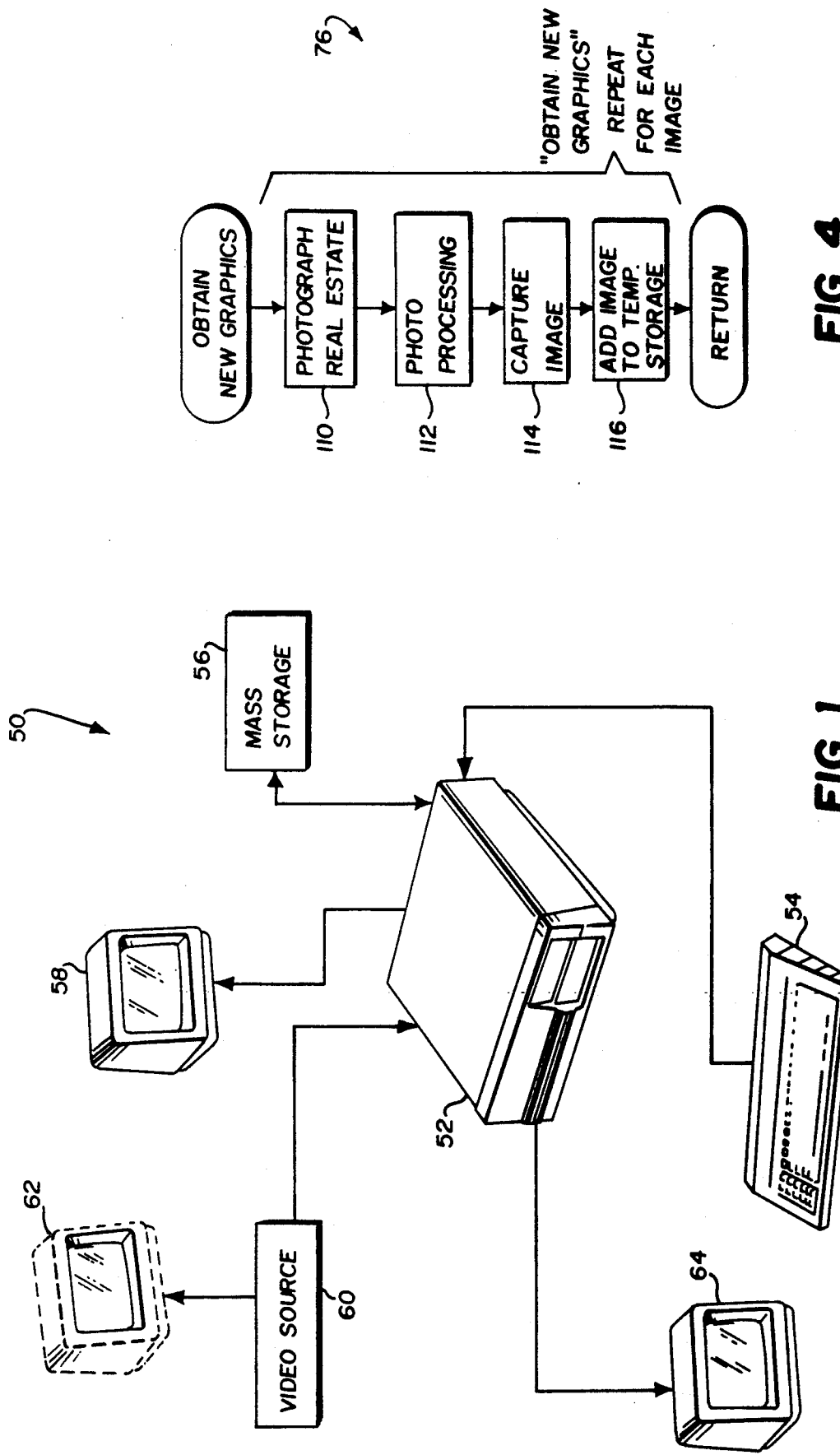
FIG. 1 is a schematic block diagram of an exemplary graphics capture system in accordance with the present invention.

FIG. 1 is a schematic block diagram of a presently preferred exemplary graphics capture system 50 in accordance with the present invention. System 50 includes a microcomputer 52 and associated keyboard 54, a mass storage device 56, a graphics monitor 58, a source of video 60 (and optional associated live video monitor 62), and a text monitor 64.

Video source 60 provides video signals representing images to be captured. In the preferred embodiment, video source 60 actually comprises two alternate sources selectable under software control: a video tape recorder capable of playing back videotaped footage of real estate properties; and a video camera mounted on a copy stand for producing video of photographic prints placed on the copy stand. Optional live video monitor 62 is not really necessary, but may be helpful for locating/editing video taped footage.

The output of video source 60 is applied to the input of an AT&T Targa 8 video digitizer board internal to microcomputer 52 (which in the preferred embodiment is a Zenith 241 PC/AT personal computer with color graphics). CRT monitor 58 in the preferred embodiment is a Sony KV-1311 monitor which is connected to the monitor/display output of the internal video digitizer. Additional text monitor 64 is connected to the main monitor output of microcomputer 52—thus permitting simultaneous display of information stored in the display buffer of microcomputer 52 (on monitor 64) and graphics information stored in the on-board frame buffer of the internal video digitizer (on monitor 58). Video provided by video source 60 is processed by the AT&T video digitizer internal to microcomputer 52, and the processed video is displayed on monitor 58. In the preferred embodiment, the video digitizer permits two modes of display: "live video" (i.e., the "live" output of video source 60) can be displayed on monitor 58; or alternatively, digitized video stored in the digitizer frame buffer can be displayed on the monitor.

Digitized image and other information may be written from the frame buffer of the internal digitizer onto magnetic tape loaded on mass storage device 56. Mass storage device 56 in the preferred embodiment is a STORAGETEK tape drive connected to microcomputer 52 via an Innovative Data Technology ("IDT") tape controller.

Microcomputer 52 includes an internal hard disk drive which stores various software used to capture, process and store digitized images. Various conventional software packages are used for utility operations in the preferred embodiment (e.g., Blaise C Tools for text screen displays, Blaise C Tools II for clock and interrupt routines, AT&T libraries for Targa 8 video digitizer graphics routines, and Innovated Data Technology routines for control of mass storage device 56). These various utility routines are called and controlled by a custom-designed menu driven software interface which performs substantial image processing functions in addition to providing sophisticated control of the various parts of system 50. The user interfaces with and controls the system 50 and associated program control software via text monitor 64 and keyboard 54.

The software interface provides, for example, a "main menu" which provides user control for various digitizing and other functions, including:

- the storage of images (begin tape, capture photos, and end tape);
- input parameters (e.g., negative/positive image rendering, and camera/VCR selection);
- output image parameters (e.g., height, width, screen mesh, number of gray levels);
- image processing parameters (e.g., maximum black value, minimum white value, ideal mid-gray value, threshold for black to white transition for line art);
- image identification parameters (e.g., format of picture identification, repetitive portion of ID, database ID); and
- storage of parameters (e.g., database name, permanent storage).

OVERALL DEVELOPMENT AND PRINTING OF GRAPHICS & TEXT

Figure 2:
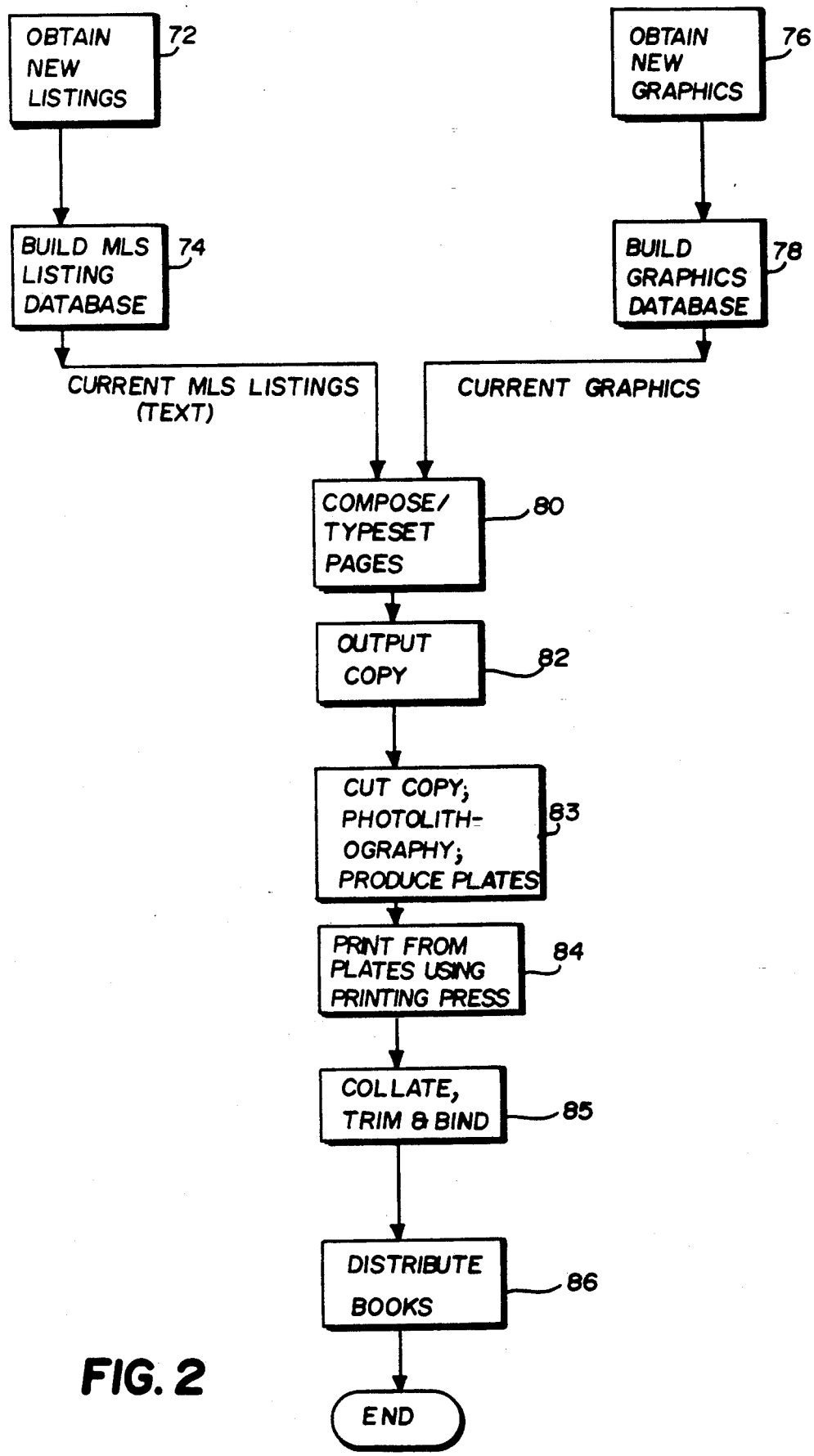
FIG. 2 is a overall flow chart of steps performed in accordance with the presently preferred exemplary embodiment of the present invention.

FIG. 2 is an overall schematic flowchart of the steps performed by the preferred embodiment in accordance with the present invention for building a real estate MLS listing textual database, building a corresponding graphics database, and electronically merging the two databases to provide copy for typesetting and printing of an MLS listing "book."

New textual MLS listings of real estate properties which are to be listed for sale are obtained in the form of a "transaction list" from a main-frame computer which maintains a current MLS database (block 72). This MLS database is maintained by real estate brokers and agents (who add, change and delete listings "on-line") and thus is always up-to-date. A current MLS listing database is built in the preferred embodiment from the transaction list and from an archive ("shadow") of the last MLS listing database (block 74). Meanwhile, images are obtained from the listing agent for each newly listed property (block 76)—either in the form of video tape footage of the properties or in the form of photographic materials (preferably standard sized black and white photographic prints).

These images are captured and processed by system 50 shown in FIG. 1 (in a manner which will be described in much greater detail shortly), and a graphics database is built from the new images and from a library of graphics captured previously (block 78).

The textual listing database produced by block 74 contains the text information for all listings to appear in the MLS listing book, and the graphics database produced by block 78 contains digitized graphics corresponding to the text information in the textual database. A mainframe computer electronically merges and composes the text information in the text database with the graphics images in the graphics database to produce a stream of digital information defining text and embedded graphics (block 80). This stream of information is converted to half-tone format and printed using an electronic typesetter (block 82), and is further processed using conventional printing techniques (photolithography, plate making and stamp printing, blocks 83–85) to print the MLS book. These books are then distributed to real estate agents (block 86).

BUILDING AND MAINTAINING TEXT DATABASE

Figure 3:
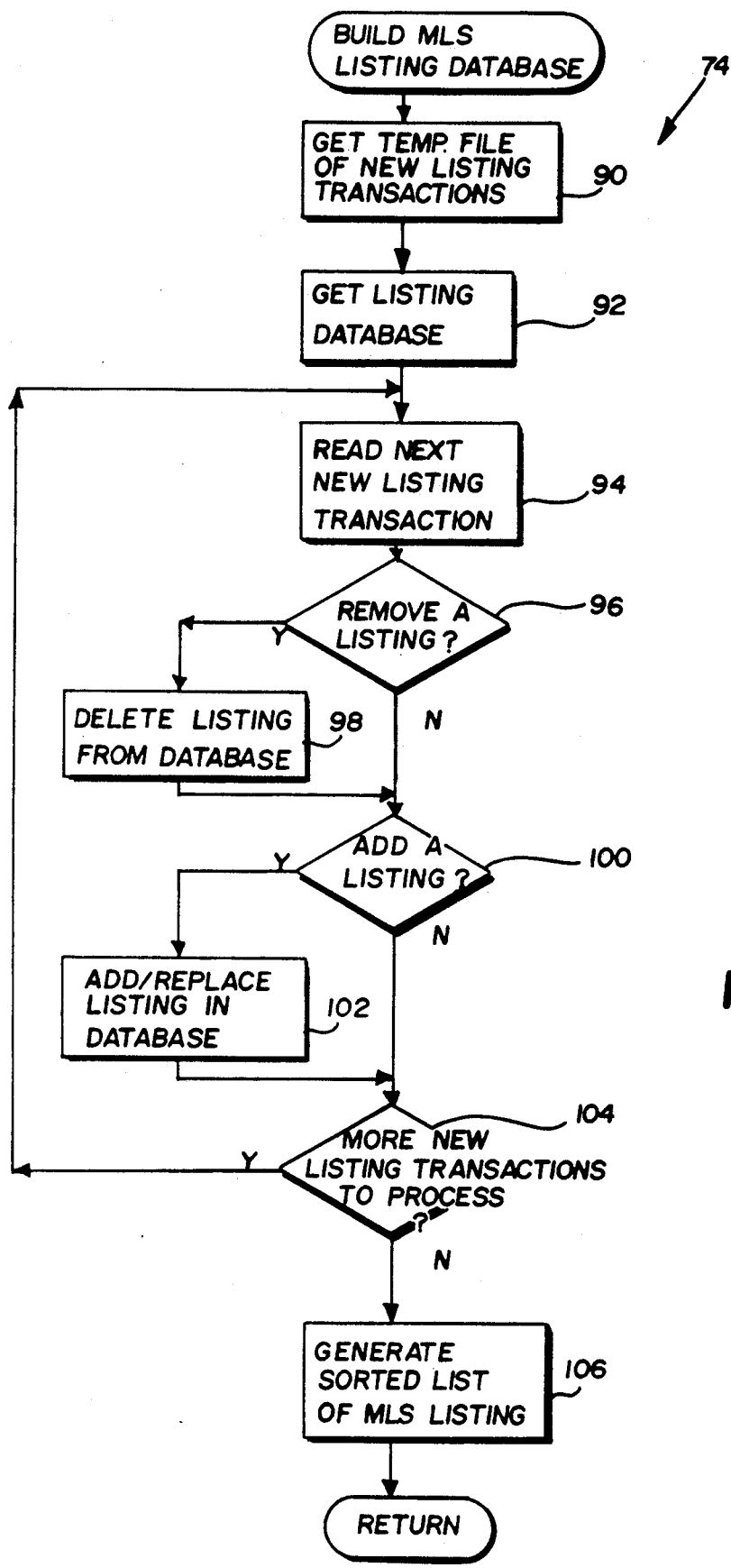
FIG. 3 is a flow chart of the "build MLS listing database" block shown in FIG. 2.

FIG. 3 is a detailed flow chart of the "build MLS listing database" block 74 shown in FIG. 2. In the preferred embodiment, the main frame which maintains the MLS listing database also maintains a transaction listing of all additions, modifications and deletions to the MLS database for a predetermined short period of time (e.g., a week). In the preferred embodiment, the main frame and associated software used to maintain the MLS listing database and this transaction file includes a conventional PDP-11 computer manufactured by Digital Equipment Corporation and REALTRIEVE software developed by the assignee of the subject application (this software has been used for a number of years in many different locations throughout the United States and Canada). Once a week (or at any other desired interval of time), the "new transaction listing" file is dumped for the purpose of producing an MLS book (block 90).

Archives of the MLS listing databases for specific customers are maintained (e.g., these archives date from the time MLS listing books was last printed for the customers) and are retrieved from mass storage (e.g., tape) (block 94). The entries in the new transaction listing are then applied to the archived listing database in order to update the listing database to current status. In particular, the preferred embodiment reads a listing from the listing transaction file (block 92), and determines whether the transaction is a listing deletion (decision block 96), or a listing addition/modification (decision block 100). If the transaction list entry specifies deletion of a listing, the corresponding listing is deleted from the database (block 98). If, on the other hand, the new transaction file specifies changes to an existing listing or addition of a new listing, the new listing information is inserted into the listing database (block 102). This process continues until all entries in the new listing transaction file have been processed (decision block 104).

Finally, a sorted list of all of the current MLS listing numbers is produced from the now-current MLS listing database (block 106). The MLS listings are sorted in accordance with customer requirements in the order in which they will appear in the MLS listing book. The customer typically specifies this order based upon variables contained in each textual listing. Typical variables used to sort the listings include property type (e.g., commercial or residential), geographical area, number of bedrooms, and listing price. Thus, for example, an MLS listing book may list all residential properties in a certain geographical area in order of ascending price before listing any residential properties in another geographical area, and may group all residential properties together and all commercial properties together. In the preferred embodiment, a list of MLS numbers (unique multidigit numerical numbers assigned to properties at the time the properties are listed for sale) is sorted rather than sorting the records in the database. This sorted list of MLS numbers is then used to index the records in the database (the preferred embodiment also uses the MLS listing number to correlate graphics images with text information). The output of block 106 includes: (1) a list of the MLS numbers of all listings to appear in the MLS listing book sorted by the order the corresponding listings will appear in the book; and (2) the complete database of the text information of all MLS listings to appear in the book, indexed by the listing number sorted list.

BUILDING AND MAINTAINING GRAPHICS DATABASE

Figure 5:
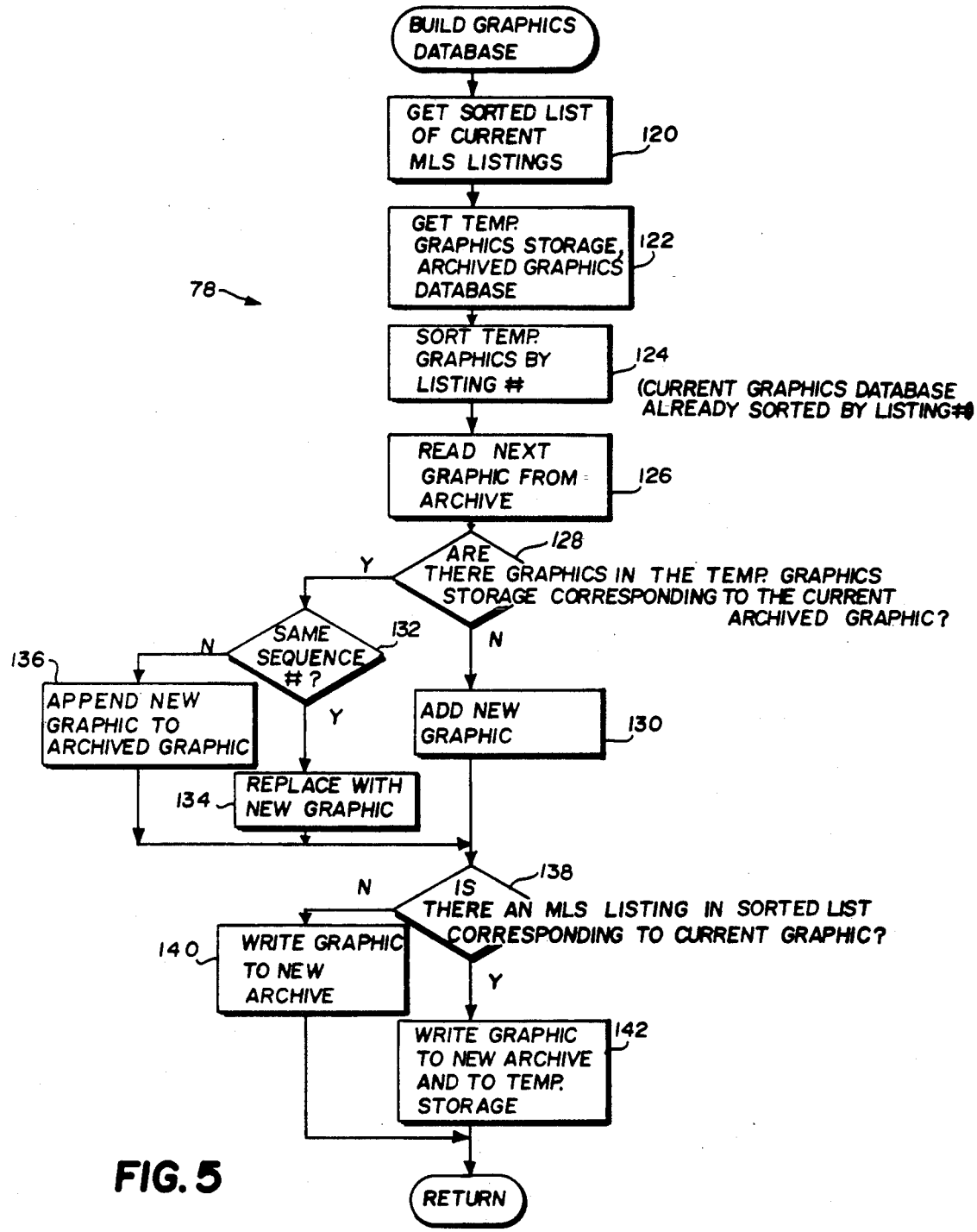
FIG. 5 is a flow chart of the "build graphics database" block shown in FIG. 2.

FIG. 4 is a flow chart of the "obtain new graphics" block 76 shown in FIG. 2, and FIG. 5 is a detailed flow chart of the "build graphics database" block 78 of FIG. 2. Before a real estate agent or broker lists a new property for sale, he or she typically photographs the property using either a 35 mm SLR camera or a portable 8 mm "video cam" portable video camera/recorder (block 110). Typically, the agent shoots and selects a single view of a particular property for publication in the MLS listing book. Some properties, however, may justify additional views, (e.g., a swimming pool, a spacious recreational area, interior views of spectacular entranceways, or the like). After photographing the properties, the agent has the film processed (block 112), selects the resulting photo or photos to be printed in the MLS listing book, and marks the back of the prints with the MLS listing number of the property (or if video taping is used, somehow designates the MLS listing number on the video tape along with the view or views to be published in the MLS listing book). The photographs and/or video tapes of the desired images to be published are then provided to an operator of the capture work station system 50 shown in FIG. 1. The operator captures the images (block 114) using system 50, and stores the resulting digitized images on mass storage device 56 (block 116).

The exemplary program control steps shown in FIG. 5 read the graphics stored on mass storage device 56 and build a current graphics database corresponding to the current MLS listing textual database in preparation for publishing the graphics in the MLS listing book. The process of producing the current graphics database in the preferred embodiment is intermeshed with the process of maintaining a library of recently used graphics. It is common in the real estate market for properties to be listed, soon thereafter temporarily removed from the MLS listing service, and then subsequently listed again. Because the image capture process shown in flow chart form in FIG. 4 is relatively labor intensive, it is desirable to avoid capturing an image again once it has already been captured. Accordingly, the preferred embodiment maintains a library of recently "active" and currently "active" images which is occasionally "purged" (e.g., so that any properties which have not been listed for over three months or some other convenient time period can be deleted). Maintaining a library containing currently listed properties as well as recently (but not currently) listed properties not only minimizes redundant capturing of images—it also has other advantages as well (e.g., permitting publication of a book of recently sold properties).

To build and "maintain" the graphics library/database, the sorted list of current MLS listings produced by FIG. 3 block 106 is first obtained from mass storage (note that only the list of MLS listing numbers for listings to appear in the book is required at this point—the associated text descriptions are not needed to build the graphics database). Also required is the temporary storage output of the capture process produced by block 116 of FIG. 4, and an archive of the image library produced the last time block 78 was performed (in the preferred embodiment, this archive is maintained on magnetic tape in listing number order). In the preferred embodiment, the graphics in temporary storage may first be indexed (or sorted) by listing number order if desired (block 124). The listing numbers of graphics in the graphics library are then read from the archive one at a time and compared with (1) the listing numbers in the temporary graphics storage produced by capture system 50, and (2) the listing numbers in the sorted list of current MLS listings.

If there are graphics in the temporary graphic storage which correspond to an already archived graphic (decision block 128), then it is determined whether the new graphic is supposed to replace the existing archived graphic or alternatively should be added to the graphics library and the already existing graphic. The preferred embodiment allows multiple images to be maintained for any particular listing number, the multiple images being distinguished from one another by an additional "sequence number" which specifies the relative sequence of multiple images for the same listing number and the number of images for that listing (in the preferred embodiment as many as five different images can be maintained for the same listing). If the graphic in the temporary graphic storage has the same sequence number as a graphic already existing in the graphics library (decision block 132), the new graphic replaces the existing graphic in the graphics library (block 134). On the other hand, if the sequence numbers are different, the new graphic is added to the graphics library and to the existing archived graphics for that listing number (block 136).

If the new graphic corresponds to an MLS listing number not already present in the graphics library, the new graphic is added to the library (block 130). Finally, decision block 138 determines whether the graphic currently being processed corresponds to an MLS listing number occurring in the sorted list of current MLS listings to be printed in the book. Graphics which are not in the current list are merely written to the new archive of the graphics library (block 140), while graph-ics which are on the list are written (in listing number order) to both the new archive of the library and to a further mass storage device containing all graphics to be published in the current MLS listing book (block 142).

CAPTURE AND STORAGE OF GRAPHICS

Now that the overall process of FIG. 2 blocks 172-78 have been discussed, a discussion of the manner in which graphics are captured and stored by system 50 shown in FIG. 1 will be presented in connection with FIGS. 6-12.

FIG. 6 is a detailed schematic flow chart of exemplary program control steps performed by the "capture image" block 114 shown in FIG. 4. When system 50 is first powered ON, a program initialization routine is performed to initialize various software controlled parameters. The initialization routine installs clock interrupt handling routines (e.g., using routines from conventional Blaise software packages for interrupt replacement), initializes a text graphics adaptor internal to microcomputer 52 (e.g., using routines from the Blaise software package for screen management), and then sets up a default database using settings from a disk file CAPTURE.CFG containing default parameters. Next, the Targa 8 digitizing board/graphics adaptor is initialized using conventional AT&T software routines, and a main user menu is displayed. Menu display on monitor 64 is handling using conventional text display routines provided by the Blaise software package in the preferred embodiment, and user input is accepted using conventional Blaise routines that retrieve key strokes entered into keyboard 54.

To provide a user-friendly environment, user inputs screens are provided whenever choices for a particular variable to be inputted by the user cannot be presented sequentially. A typical user input screen presents a prompt defining the type of input required and a data entry window sized to the maximum characters permitted, this window containing the current or default value (if there is one) of the prompted variable with the cursor placed at the end of that value. Variables are restricted in the preferred embodiment to text only input. However, three special sequences are provided in the preferred embodiment. The "Cancel" key exits the input screen leaving the value of the prompted variable set as it was when the screen was first displayed. The "backspace" key erases the previous character and back up the cursor for overwriting. The "return" key validates and sets the variable to the value appearing in the input screen window.

The main menu provides various options for overall control of system 50. A summary of the various main menu options appears in Table I below:

TABLE I

| Main Menu Options | |
|---|---|
| Exit to DOS | If tape has been started but not ended, end tape using conventional routines; reset AT&T Targa board using routines from AT&T for graphics; reset text board using routines from Blaise for screen management; restore original clock interrupt using routines from Blaise for interrupt management, exit program and return to operating system. |
| Begin tape | If tape has not already been started, initialize tape. |
| Capture photos | Set the Targa 8 for the current type of input (camera or VCR) using a routine from AT&T; compute maximum crop area; display capture menu. |

TABLE I-continued

Main Menu Options

| | |
|---|---|
| End tape | If tape has been started but not ended, end tape. |
| Height of crop | Display user input screen for height of crop (expressed in inches, decimal or fractional) and accept user input. |
| Width of crop | Display user input screen for width of crop (expressed in inches, decimal or fractional) and accept user input. |
| Mesh of screen | Display user input screen for mesh of screen (the number of halftone cells or lines per inch) and accept user input. |
| Data type | Switch current type of input between positive and negative. |
| Source type | Switch current type of source between camera and VCR. |
| Gray levels | Set current number of gray levels to next power of 2 (2, 3, 8, 16, 32, 64, 128, 256). |
| Upper value for black | Display user input screen for maximum value for black (the maximum output gray value) and accept user input. |
| Mean value for midrange | Display user input screen for mean value for midrange (the output gray for the average, or midtone input gray value) and accept user input. |
| Lower value for white | Display user input screen for minimum value for white (the minimum output gray value) and accept user input. |
| Threshold for line art | Display user input screen for threshold for line art (the output gray value below which all values are set to white) and accept user input. |
| Format for list number | Display user input screen for format of picture ID (an edit mask controlling placement of digits, uppercase, lowercase, alphabetics, spaces, required and optional characters) and accept user input. |
| Prefix for list number | Display user input screen for prefix of picture ID (the characters to be copied into the picture ID whenever displaying a picture ID input screen) and accept user input. |
| ID for city | Display user input screen for the database ID of pictures (the 3-character name of the database a picture belongs to) and accept user input. |
| Add to permanent settings | Display selection screen with name of currently saved database parameters; selection screen includes; exit-display main menu, delete-remove the database entry and rewrite the CAPTURE.CFG file, replace-take the current values and use them to replace the values of this database entry and rewrite the CAPTURE.CFG file, add/display the user input screen prompting for a name for this database entry and rewrite the CAPTURE.CFG file. |
| Name database | Recall next or previous set of stored database parameters, displaying them and making them current. |

IMAGE CAPTURE

Figure 7A:
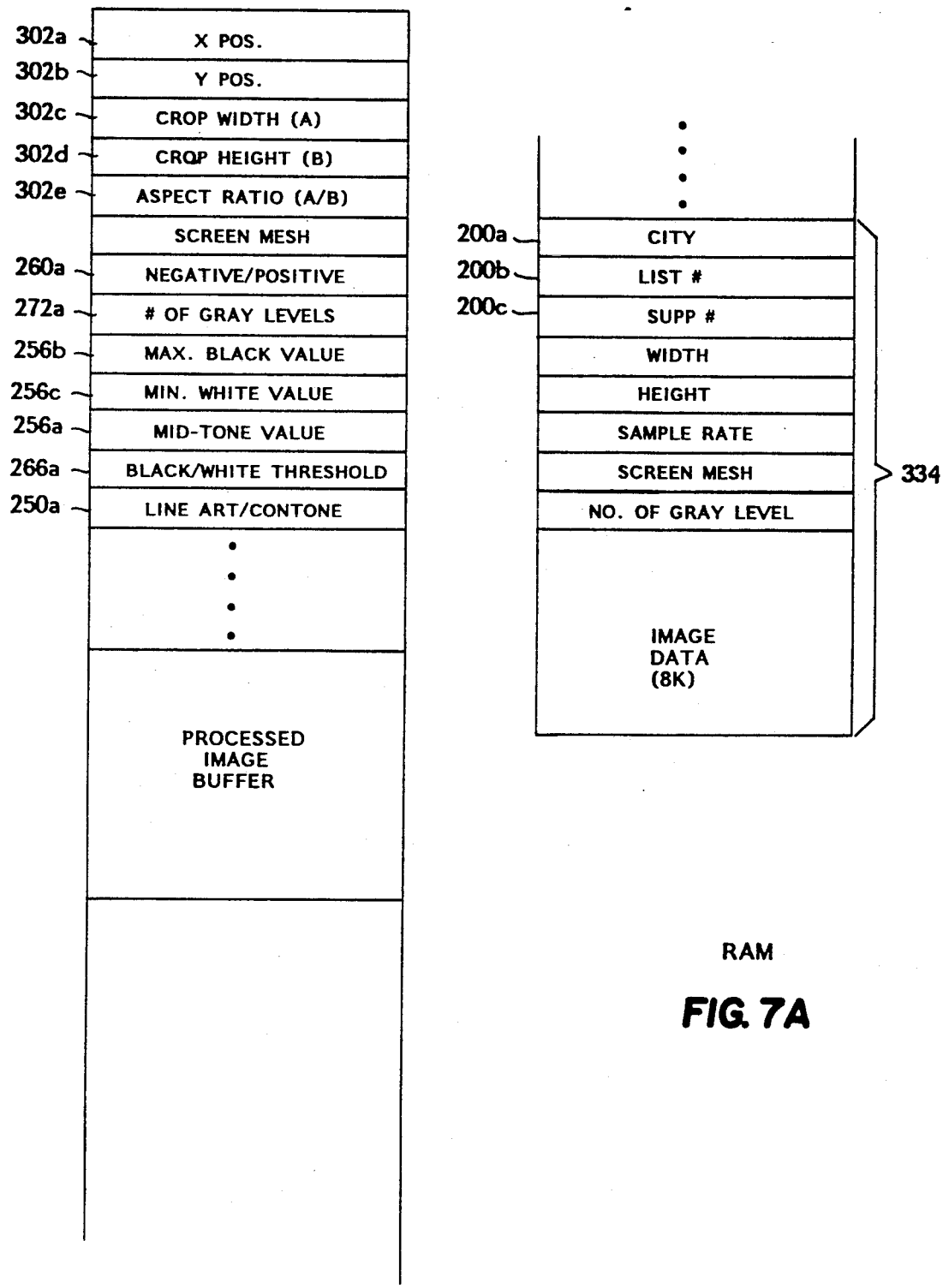
FIGS. 7A and 7B are schematic diagrams of data structures used by the system shown in FIG. 1.

The typical capture process begins by prompting the user for information identifying the next image to be digitized (FIG. 6 block 200). The user inputs city name, MLS listing number, and supplement number in response to this prompt (supplement number is used to distinguish multiple images corresponding to the same listing number in the preferred embodiment). These three values are written into temporary storage locations 200A, 200B and 200C in the random access memory of microcomputer 52 as is shown in FIG. 7A—after being checked to ensure that they conform to default format of picture ID information stored in the configuration file. This identification information is preferably obtained by the operator of system 50 from labels attached to the back of photographs (or recorded on videotape if VCR input is used).

Once the user has identified the next image to be inputted, monitor 58 displays the "live" image over which a crop window is superimposed (block 202)—and simultaneously, monitor 64 displays a "capture menu." The capture menu allows the user to change the size and position of the crop window superimposed over the live image area, and also permits picture-by-picture modification of the number of gray levels, and all processing parameters (there is also an option to posterize the gray scale to black/white for line art). The following Table II shows the various options of the capture menu:

TABLE II

Capture Menu

| | |
|---|---|
| Exit to main menu | Display main menu and accept user input |
| Capture picture | Capture displayed image to Targa 8 memory using routines from AT&T and process at picture ID validation screen. |
| Scan type of data | Switch current type of scan between contone and line art. |
| Gray levels | Set current number of gray levels to next power of 2 (2, 4, 8, 16, 32, 64, 128, 256). |
| Upper value for black | Display user input screen for maximum value for black (the maximum output gray value) and accept user input. |
| Mean value for midrange | Display user input screen for mean value for midrange (the output gray value for the average input gray value) and accept user input. |
| Lower value for white | Display user input screen for minimum value for white (the minimum output gray value) and accept user input. |
| Threshold for line art | Display user input screen for threshold for line art (the output gray value below which all values are set to white) and accept user input. |
| Restore crop | Center the crop window on the screen image and make it as large as possible maintaining the ratio of height to width; redraw crop using routines from AT&T. |
| Range of movement (1-9) | Set the number of pixels (from 1-9) the crop window is to change when being moved or sized. |
| Move crop (the arrow keys) | Move the crop window the rate number of pixels in the direction of the arrow; redraw crop using routines from AT&T. |
| Size crop (+ or −) | Increase or decrease the crop window size the rate number of pixels maintaining the ratio of height to width; redraw crop using routines from AT&T. |

During capture from photographs, the user can change the crop, framing and composition of the image either manually (by physically moving the photograph laterally on the copy stand with respect to the video camera lens, zooming the camera lens in and out and/or raising or lowering the camera on the copy stand); or electronically by repositioning and/or changing the size of the crop window under software control. In the preferred embodiment, only the portion of the "live image" within the crop window is digitized, the image portions outside of this window being ignored. For videotaped images, the user must adjust the size and/or position of the crop window electronically in order to change the composition and framing of the image.

Monochrome video digitizers like the Targa 8 digitizer used in the preferred embodiment capture a fixed number of pixels horizontally and a fixed number of pixels vertically. FIG. 9A is an illustration of a rectangular area 300 digitized by the digitizer—which is 400 pixels in height by 512 pixels in width in the preferred embodiment. The preferred embodiment then constructs, under software control, a crop window 302 which outlines a portion of the image, this image portion being the only portion which will be actually be digitized and converted to an output graphic by system 50.

In the preferred embodiment, a crop window 302 is constructed under software control. This crop window 302 has a horizontal dimension A and vertical dimension B. In general, it is possible under software control to set A and B independently to any desired values. However, the preferred embodiment constrains the final size of output images to certain uniform absolute dimensions (so that all images in the MLS listing book have the same uniform dimensions). System 50 permits a user to vary the absolute dimensions of both A and B, but constrains the relative dimensions of these two variables so that an "aspect ratio" of A/B is a constant (this constant being predetermined by the uniform image size to appear in the printed MLS listing book).

The user is thus allowed to change the size of crop window 302 and is also permitted to move the position of the crop window relative to the array of pixels displayed on monitor 58. Although the crop window position is generally set by default to the center of the display of monitor 58 and the crop window size is set to an arbitrary size occupying most but not all of the live image display, the user may select and adjust these parameters by making various selections from the capture menu (as determined by decision block 204). Exemplary program control steps performed by the preferred embodiment to adjust crop window parameters are depicted in the flow chart of FIG. 8.

Briefly, the parameters which determine the x position and y position of the crop window 302 and the width A and height B of the crop window are stored in random access memory storage locations 302A-302D shown in FIG. 7A. These four parameters are initially read from a configuration file stored on a disk and are thereby set to default values. An aspect ratio is calculated from additional prespecified values specifying the fixed output image width dimension and the output image height dimension, and this aspect ratio is stored in storage location 302E.

Blocks 210-224 shown in FIG. 8 permit the user to independently change the positional parameters stored in locations 302A and 302B. Blocks 226-232 permit the user to change the "size" of crop window 302 by, for example, varying the values stored in crop width A location 302C and computing corresponding new crop height B values in accordance with the fixed, constant and predetermined aspect ratio stored in location 302E. FIG. 8 blocks 206, 208 permit the user to reset the values of storage location 302A-302E to their default settings, while the steps of blocks 234, 236 allow the user to change the rate at which the parameters change value for each input change (and thus, in effect, control the "sensitivity" of the software to user input).

Once the user has adjusted the position and size of the crop window 302 (block 206 shown in FIG. 6), the user may decide to "capture" the image by converting it into digital form. Capture is performed by depressing the "capture key" on keyboard 54—that is, selecting the capture option from the capture menu described in Table II. When the capture button is depressed, the portion of the image delimited by (i.e., inside) crop window 302 is digitized by the digitizer internal to microcomputer 52, and the resulting digitized image is "painted" onto display 58 to replace the "live" video image previously displayed there (blocks 242, 244). In particular, the Targa 8 digitizing board is set to display mode using the conventional AT&T software routine. Once the "frozen" frame has been painted on monitor 58, the image is further processed by block 246 in a manner which will now be explained in connection with the exemplary program control steps shown in FIG. 10.

STATISTICAL IMAGE PROCESSING

It will recalled that the width and height of the final image (shown in FIG. 9B) is constant for the particular printing process and format being used—that is, in the preferred embodiment, all images printed in the MLS listing book have the same uniform size. In addition, another printing parameter called "screen mesh" is generally predetermined for a particular typesetter and printing process. "Screen mesh" refers to the number of dots of ink per inch, and typically ranges from 65 dots per inch to 133 dots per inch (with 65 dots per inch, 85 dots per inch and 100 dots per inch being typical for the printing of MLS listing books). System 50 must map input pixels produced by video source 60 into output dots readable by the particular electronic typesetter being used to produce the final copy. Specifically, there must be a 1-to-1 mapping of a certain number of input pixels to a certain (typically different) number of output dots, the specific correspondence between the two depending upon the size of crop window 302 the user has selected.

In the preferred embodiment, the typical output format for images is the conventional "contone" format used by conventional electronic typesetters. As is well known, the "contone" format requires each dot in the final image to be specified in terms of gray scale intensity levels and position. System 50 performs this mapping of input pixels to output dots, and also performs statistical analysis and contrast/level adjustment to ensure uniformity of the printed images.

The photographs or video images being captured come from a variety of different sources (not all of which involve experienced photographers), and many images are likely to be improperly exposed or shot under less than ideal lighting conditions. The statistical analysis performed by blocks 252-258 redistributes pixels densities in accordance with a desired statistical normal distribution between end points that are prespecified and optimized in accordance with the particular printing process being used.

Briefly (referring now to FIG. 10), system 50 first counts the number of pixels at each different gray scale level occurring within crop window 302 (block 248). If the image mode is set to "contone" (as tested for by decision block 250 in response to the value stored in storage location 250A shown in FIG. 7A), system 50 then calculates the mean and standard deviation values of the image based upon the number of pixels counted by block 248 (block 252). The minimum and maximum values of the middle 90% of the image are then calculated (block 254) by determining the fifth and ninety-fifth percentile gray scale image values. The mean value of the gray scale distribution is also calculated using standard statistical techniques (block 256).

An output table is then constructed based upon the minimum and maximum values calculated by block 254, the mean value calculated by block 256, and user-specified desired minimum, maximum and mean values. This table is then used to map ("transform") all input gray scale levels into adjusted gray scale levels. In particular, input gray scale values of the various pixels are mapped into corresponding output gray scale levels having an optimized contrast range and image density.

Specifically, a default (or user specified) gray scale midtone value, maximum black value and maximum white value are initially stored in storage locations 256A-256C, respectively (e.g., from default values stored on disk). The midtone value is used as a predetermined desired mean (average) gray scale value, while the maximum black and minimum white value correspond to the limits of the gray scale levels for the particular printing process being used. In other words, the maximum black value specified is the gray scale level for the "blackest" dot to appear in the final image, while the minimum white value specifies the gray scale level of the "whitest" dot to appear in the final image. A midtone value (which is not necessarily halfway between the maximum black and the minimum white values) specifies the average intensity of the final image. These values 256A-256C are selected and optimized using empirical techniques based upon image results and, to some extent, viewer preference.

So long as the image mode is "contone" as opposed to "line art" (meaning that gray scale data is to be preserved as selected by decision block 250 in response to a mode value stored in storage location 258), the mean and standard deviation values of the intensities of the pixels within the crop window 302 are calculated in accordance with standard statistical analysis routines from the numerical distribution of levels counted by block 248 (block 252). The top 5% and bottom 5% of the range of gray scale intensity values are then discarded in the preferred embodiment (the top 5% will be mapped into the same "blackest" intensity and the bottom 5% will be mapped into the same "whitest" intensity). The mean of the remaining points existing between maximum and minimum values of the "middle 90%" of the gray scale range is determined from the standard deviation calculated by block 252 (block 254). Next, this mean gray scale value determined by block 252 is assigned to be equal to the midtone value stored in storage location 256A (block 256). Similarly, the minimum (i.e., 5th percentile) gray scale value is forced to be equal to the minimum white value stored in location 256C, and the maximum (i.e., 95th percentile) gray scale value is forced to be equal to the maximum black value stored in location 256B.

Finally, normal distributions are calculated between the midtone and the minimum white value and between the midtone and the maximum black value, and an output table which maps all of the different possible gray scale input pixel levels into new normalized gray scale levels is constructed in accordance with these normal distributions and the number of gray scale levels specified by the contents of location 272 (block 258). Gray scale levels between the first percentile and the fifth percentile are mapped into the minimum white value stored in location 256C, and all gray scale levels falling between the 95th percentile and the 99th percentile are mapped into the maximum black value stored in location 256B in the preferred embodiment. All gray scale levels falling between the mean and the 95th percentile are mapped in accordance with a normal statistical distribution defined between the midtone value and the maximum black value; and all gray scale levels falling between the fifth percentile and the midtone value are mapped in accordance with a normal statistical distribution defined between the minimum white value and the midtone value.

Each pixel intensity (i.e., gray scale) value stored in the frame buffer of the digitizing board is then transformed ("mapped") to a corresponding output value in accordance with the output table constructed from the statistical analysis performed by steps 240-258. If the user has selected the negative output option (storage location 260A shown in FIG. 7A), the mapping is also performed in "reverse" video (i.e., lighter values are mapped into darker values and darker values are mapped into lighter values in accordance with specific printing processes that require "negative" images and/or if the initial image materials are negatives rather than positives) (blocks 260, 262). Finally, the newly mapped intensity values are redisplayed on display 58 instead of the original "frozen" images so that the user can view the precise image as it will appear in the printed MLS listing book (block 264).

As mentioned above, the midtone, "whitest" and "blackest" levels are typically set using empirical techniques based on the appearance of the processed image displayed on monitor 58 and based on prior experience with the particular printing process being used. As will be explained in greater detail shortly, the contone ("continuous tone"—i.e., gray scale level) image representation is eventually converted by an electronic typesetter to a conventional half-tone image consisting of "dots" of varying sizes and spacings. Briefly, this conversion of contone to half-tone maps gray scale level pixels into "dots"—where the number of pixels contributing a particular dot varies with sampling rate and the size, shape and/or position of the half-tone dots is determined based on the gray scale levels of the pixels it is generated from. The half-tone image is then converted to a printing plate using photolithography techniques (which may involve photo reduction). This plate (which bears "dots" of raised material to which ink adheres, these dots corresponding to the dots in the half-tone image) is used to apply ink to paper in the acutal printing of the book.

The photolithography and other processes associated with converting the half-tone image to a printing plate often exhibit a phenomenon known as "dot gain"—where the dots increase in size to a varying degree due to inaccuracies inherent in the process. Dot gain is usually unnoticeable for text information, but has a significant (and usually detrimental) effect on images. Specifically, dot gain may cause an image to be more dense (darker) than originally intended.

The ability provided by the present invention to make the density and contrast of all images uniform allows the operator of capture workstation 50 to set the midtone, "whitest" and "blackest" gray level values to compensate for dot gain and other phenomena inherent in the typesetting, photolithography and printing processes being used. For example, there is a direct relationship between the midtone (and other) settings for an image and the size of the average half-tone ink dot in the printed rendition of that image. The statistical and customizing image processing techniques of the present invention allow a user to, in effect, specify and control the size (and other properties) of the ink dots in the final printed image very accurately. This has not been possible in the past where images were supplied directly from photographs pasted onto the final copy. The ability to exercise this high degree of quality control over the final printed image permits the operator of workstation to optimize the properties of the captured workstation in accordance with quality standards—or even to produce higher print quality from specific printing presses.

If the image mode is "line art" rather than contone (as tested for by decision block 250), the statistical analysis described above is not used in the preferred embodiment. As is well known, "line art" discards gray scale information, since only two dot values are permitted: black and white. To convert the input pixel gray scale levels to line art values, the same mapping technique is used except that all gray scale levels below a black/white threshold level (established by the values stored in random access memory storage location 266A) are mapped into the "whitest" (minimum) density level, while all gray scale levels above this black/white threshold are mapped into the "blackest" (maximum) density level. The mapping of input gray scale levels into output black or white levels proceeds as before, with image reversal performed by blocks 260, 262 if necessary. The mapped output values are then displayed on monitor 58 to permit the user to review the resulting output image (block 264).

The user then rejects or validates the digitized processed image displayed by block 254. If the user is not satisfied with the composition (e.g., framing and/or crop size) and/or the contrast and density of the digitized, processed image displayed by monitor 58, he or she can choose to recapture the image by selecting a "recapture" menu option (as tested for by decision block 249). Image recapture basically "throws away" the digitized image stored in the digitizer frame buffer and displays the live image with the crop window once again (block 202) in the preferred embodiment. The user may then readjust the crop window size and/or position, and can also change the "line configuration" to adjust parameters such as those shown in the flow chart of FIG. 11.

For example, based upon the redisplayed processed image appearance, the user may decide to change the number of gray scale levels (the number of levels currently used being specified by random access memory storage location 272A). In the preferred embodiment, the number of gray scale levels cycles by powers of 2 between 2 and 256, and the user can select any of these factors (blocks 272, 274).

Similarly, the user may wish to adjust the maximum black value stored in location 256B, the minimum white value stored in location 256C, or the midtone value 256A in order to alter the statistical analysis performed on contone images—via menu driven steps shown in FIG. 11 block 276–286. The user can also toggle between the "contone" and the "line art" mode (blocks 268, 270), and if in line art mode, change the black/white threshold level stored in FIG. 7A storage location 256A (blocks 288, 290).

In the preferred embodiment, the image recaptured by block 244 is automatically reprocessed by block 246 whenever any of these parameters are changed so that the user immediately sees the results of the change. Since the user selects parameter change control options via keyboard 54 from menus displayed by monitor 64 while the digitized image is simultaneously displayed on monitor 58, selection of a new image capture/processing parameter and display of the resulting modified image occur essentially contemporaneously (thus contributing substantially to the creative process and increasing user efficiency).

Once the user is satisfied with the image quality, he or she may "save" the image to tape (decision block 296, blcok 298). A detailed schematic flow chart of exemplary program control steps performed by the preferred embodiment to save an image is shown in FIG. 12.

SAVING CAPTURED IMAGES

Figure 7B:
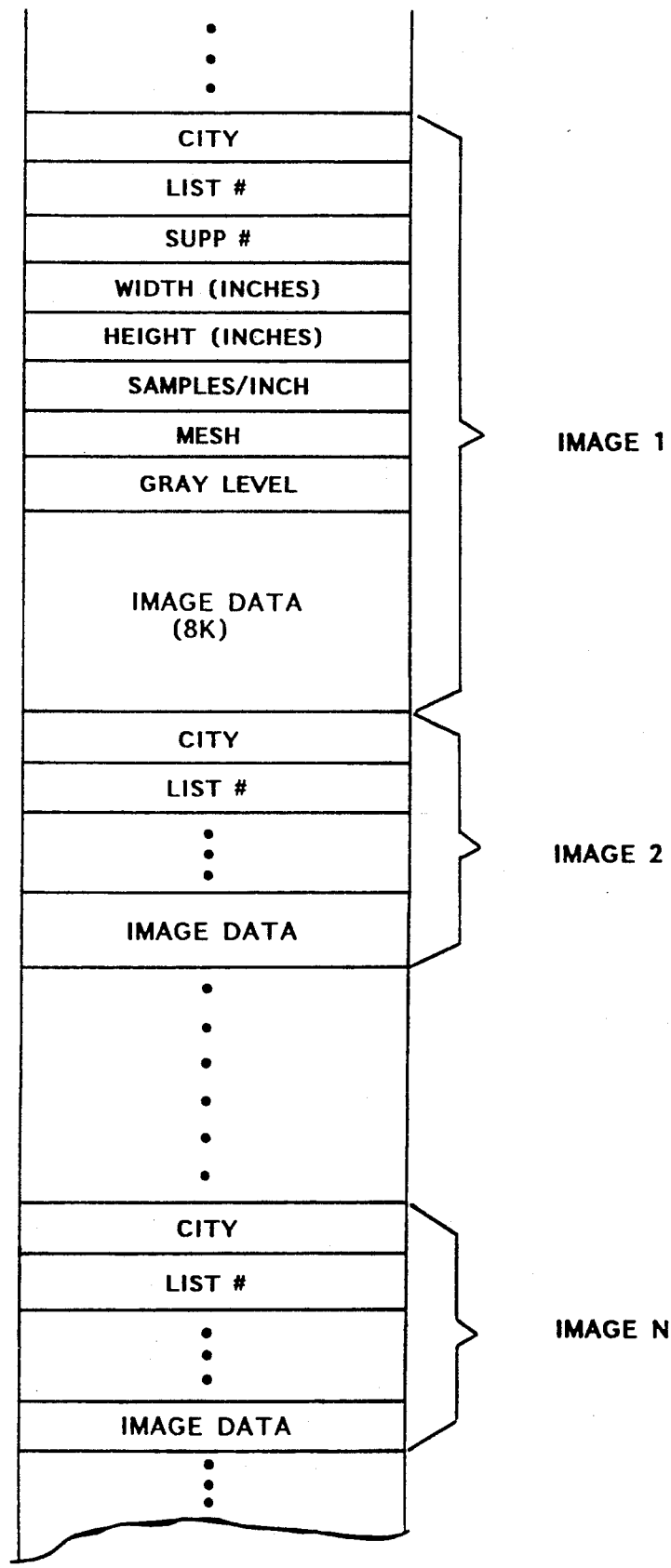

To save an image, system 50 first positions the mass storage tape cartridge device 56 to append the next record following the last record stored on tape (since the preferred embodiment uses tape, records must be stored one after another and in sequence as is shown in FIG. 7B) (block 320). System 50 then causes monitor 64 to display image identification information (e.g., city, listing number and supplement number) for user verification (block 322). Once the image identification information has been verified, the width, height and sample rate of the final output image are obtained. Referring to FIG. 9B, the image width and image height are typically predetermined constants in the preferred embodiment and generally need only be retrieved from memory or disk rather than actually computed. However, sample rate varies depending upon the size of crop window 302 (which changes from one image to the next).

This sample rate specifies the number of input pixels per inch of the desired output image size. System 50 calculates this sample rate by dividing the number of input pixels across the horizontal A direction of crop window 302 by the number of inches across the output image width (which is specified by the "width of crop" parameter) in the preferred embodiment. Because the preferred embodiment uses a fixed aspect ratio for crop window 302 which is prespecified in advance in accordance with the absolute dimensions of the output image, the sample rate across the output image horizontal dimension is the same as the sample rate across the output image vertical image in the preferred embodiment. This is an important aspect of the present invention, since it eliminates the need for image scaling in either dimension—and the image distortion which typically results from scaling. Because the screen mesh of the output image is the same in both dimensions, the present invention ensures that the sampling rate is also the same in both dimensions.

The following information is then written into an output buffer 334 shown in FIG. 7A: image city identification field; image listing number; image supplement number identification field; output image width and height; calculated sample rate; screen mesh; number of gray levels; and eight kilobytes of image data (blocks 326–330). As will be explained shortly, the first three fields in the output buffer (city, listing number and supplement number) are used to correlate image records with MLS listing text records, while the remaining information written into the output buffer is used without modification to directly control the automatic typesetter to embed image data within a page of text data. Once the data is stored in the output buffer 334, the contents of the output buffer are written to mass storage device 56 (block 332) (see FIG. 7B). System 50 then reverts to decision block 299 shown in FIG. 6—at which stage the user is given the option of capturing another image or returning to the main menu.

Capture system 50 thus permits a user to very rapidly digitize and store on a mass storage medium a large number of images with associated identification and other parameters. The stored images require no further processing or post processing before being applied to an automatic typesetter in the preferred embodiment because capture system 50 provides all information needed by the typesetter at time of image capture. All image stored on mass storage device 56 have the desired height and width dimensions and are stored with sufficient additional information to permit the automatic typesetter to render them appropriately—and have also been composed and cropped as well as balanced for contrast and image (ink) density in a series of steps capable of being rapidly and efficiently performed by non-technical users.

PRINTING THE MLS LISTING BOOK

Referring now once again to FIG. 2, the temporary current graphics produced by FIG. 5 block 142 (from the image library and the temporarily stored "new" graphics captured in the manner just discussed) are in the preferred embodiment merged with the text of the current MLS listing database using a mainframe computer system. Briefly, a conventional mainframe software package is used to read the entries in the MLS listing database in the order they are to appear in the book, and "compose" pages of printed output (e.g., generate control characters specifying page headings and text fonts, page end commands, and the like). The textual information from the MLS textual database records is inserted into the pages so composed.

The mainframe computer also reads the appropriate graphic from the information output by FIG. 2 block 78 (the graphics are indexed by city, listing number and supplement number as is shown in FIG. 7B, and the mainframe uses this indexing information to locate the graphics corresponding to the textual MLS listings it inserts onto the pages it composes). In somewhat more detail, the mainframe reads the text information in the indexed MLS listing database corresponding to the next MLS listing number in the sorted MLS listing number list produced by FIG. 3 block 106, and then retrieves the corresponding image from mass storage device 56 (see FIG. 7B)—verifying that the "city" information associated with the image data matches the city information associated with the MLS textual listing to minimize the possibility of mis-matching text listings with the wrong images.

The mainframe computer first inserts positional and other control codes into the data stream to indicate the position of a graphic to be printed and the fact that it is graphic rather than text information, and then directly copies the Width, Height, Samples/inch, mesh, gray level and image data (see FIG. 7B) into the output data stream. This copying is performed in the preferred embodiment without modifying or changing the image data or associated header captured by system 50 in any way.

In rare instances, there will be no captured image corresponding to an MLS listing to be published in the book. In such circumstances, the mainframe can reserve a blank image space over which a photograph can be pasted and/or provide a filler graphic to appear instead of an image of the property. Similarly, the mainframe may insert multiple images of a property whenever multiple images appear in the graphics database corresponding to the same MLS listing.

After one graphic record has been copied in this manner, the mainframe inserts additional text corresponding to the same listing after the graphic and then processes the next MLS listing (both text and graphic data) in the same manner.

The mainframe computer in the preferred embodiment writes its output data stream onto a mass storage medium (e.g., magnetic tape). The magnetic tape is then loaded onto the tape drive of an Autologic model APS 55/800 electronic typesetter. This electronic typesetter device converts the contone image data and text data into conventional half-tone full-page dot maps. The Autologic typesetter reads the Width and the Height parameters corresponding to each image data block from tape in addition to the samples/inch, screen mesh and # of gray levels information. The typesetter then automatically converts the digitized image information into half-tone format (if line art format is not being used) using these input parameters as input to software and hardware proprietary to Autologic (this proprietary hardware/software has long been offered for sale in the United States to the printing industry). No. image scaling is performed either horizontally or vertically, nor is any other pre-processing of image data required before it is inputted to the Autologic typesetter in the preferred embodiment. The Autologic device directly operates upon the image data (and associated parameters) as it was stored on mass storage device 56 by system 50 at time of capture.

The APS 55/800 device provides an output to a conventional Autologic model APS 6 electronic typesetter image recorder—this output including text information with embedded graphics and associated control codes. The APS 6 (a high quality graphics laser printer) renders the composed page of text and graphics in half-tone images (block 82).

The resulting composed, printed pages of text and graphics are further processed in accordance with the type of printing processes being used. In the preferred embodiment, the pages are inspected and cut and then printing plates are prepared from them using photolithographic techniques (block 83). The printing plates are installed in conventional high-speed ink printing presses and used to print corresponding pages of the MLS listing book. Because of the statistical processing performed by system 50 at time of capture to ensure uniform image density and contrast range, printing press adjustments (e.g., amount of ink applied and various mechanical plate adjustments) are typically less critical than they would be when working from copy developed from paste-up.

The printed MLS book pages are then collated, trimmed and bound (block 85) and distributed to real estate agents (blocks 86).

A system and method for developing and printing images has been described which has many advantages in any application in which images may have to be used more than once or in which a high degree of automation is required. Efficient management and organization of images is ensured by digitizing the images and organizing and maintaining the resulting digital records in a graphics library. Uniform quality (e.g., image density and contrast) is ensured by performing statistical analysis on the image data at time of capture and then permitting the capture workstation operator to review and change the image before storage if necessary. Similarly, the operator may change the crop window size and position to properly compose and frame the image before capture and storage. In accordance with one feature of the invention, information used to identify the image data is tacked on to the image data block at time of storage along with additional information specifying other parameters of the image. This identifying and additional parameter information and the image data stored at time of capture is then used directly by a digital typesetter with no further intervening post-processing to compose merged pages of text and graphics.

While the invention has been described in connection with what is presently considered to be the most practical and preferred embodiments, the appended claims are not to be limited to the disclosed embodiments, but on the contrary, are intended to cover all modifications, variations and/or equivalent arrangements which retain any of the novel features and advantages of this invention. By way of non-limiting example, the invention could be used to process newspaper or any other printed copy including text and images or images alone, and can be used in conjunction with any publishing/printing techniques.

What is claimed is:

1. An image processing system comprising:
   digitizing means for digitizing a photographic image to provide digital signals representing the densities corresponding to different locations of said photographic image;
   processing means for computing the mean and the standard deviation of the distribution of densities represented by said digital signals;
   means for developing a table in response to said mean and standard deviation and user-specified values, said table establishing a correspondence between densities represented by said digital signals and shifted densities, said shifted densities being optimized for a particular half-tone printing process;
   means for mapping said densities represented by said digital signals into said optimized shifted densities;
   means for displaying an image represented by said shifted-density digital signals;
   mass storage means, coupled to said mapping means, for storing said optimized shifted densities representing the enhanced contone image and for subsequently retrieving said optimized shifted densities for half-tone rendering; and
   means operatively coupled to said mass storage means for converting said retrieved optimized shifted densities to a half-tone representation and for rendering a half-tone image from said half-tone representation using said particular half-tone printing process.

2. A processing system as in claim 1 wherein said digitizing means includes:
   means for electronically defining a rectangular crop area having first and second dimensions, said crop area delimiting an area of said image; and
   means connected to said defining means for adjusting the size of said rectangular area and for constraining the image sample rate in the first dimension within the delimited image crop area to be equal to the image sample rate in the second dimension within said delimited image crop area.

3. An image processing system as in claim 1 wherein:
   said system further includes:
   means for specifying the following information: (a) image dimensions, (b) samples per inch, (c) mesh, and (d) gray level, and
   said mass storage means includes means for storing said mapped densities with said specified information; and
   said converting and rendering means comprises an electronic typesetter including:
   means for reading said stored information from said mass storage means, and
   means for directly converting said mapped densities to said half-tone representation in response to said read specified information 4. A system for printing images comprising:
   video source means for producing video signals representing an image;
   digitizing means for converting said video signals into digital signals encoding a contone representation of said image, said digital signals representing the densities of different locations of said image;
   means for statistically analyzing the image density distribution represented by said digital signals;
   means for shifting the densities represented by said digital signals in response to said statistical distribution and at least one density value optimized for a particular half-tone printing process;
   mass storage means coupled to said shifting means for storing said shifted density digital signals in an image database and for subsequently retrieving said shifted density digital signals from said image database so as to permit half-tone rendering of the image represented by said shifted densities;
   means operatively coupled to said mass storage means for converting said shifted density digital signals into a half-tone representation of said image; and
   means for printing dots of ink onto a print medium in response to said half-tone representation,
   wherein the size of said ink dots is optimized for said particular half-tone printing process in accordance with the results of said statistical analysis and is directly related to said optimized density value.

5. A method of printing text and images comprising:
   (I) front end processing including the following steps (a)–(d):
   (a) providing an image;
   (b) providing text corresponding to said image;
   (c) converting said image to a digital graphic, including the steps of:
      (i) electronically defining a crop area corresponding to an area of said image,
      (ii) converting the portion of said image within said crop area to digital signals representing the density distribution of said image portion, and
      (iii) statistically analyzing said digital signals and shifting the density distribution represented by said digital signals in response to said statistical analysis, including the step of optimizing said shifting for a particular half-tone printing process; and
   (d) storing said shifted density digital signals in an image database for later retrieval; and
   (II) subsequent rendering processing including the following steps (e)–(g):
   (e) retrieving said stored shifted density digital signals from said image database;
   (f) electronically merging said text with said stored shifted density digital signals; and
   (g) printing said merged text and graphic represented by said stored shifted density digital signals using said particular half-tone printing process.

6. A method as in claim 5 wherein said analyzing and shifting step comprises:
   determining the mean density represented by said digital signals,
   shifting said mean density to a user-specified midtone value empirically optimized for said particular half-tone printing process; and
   shifting the other densities represented by said signals in accordance with said midtone value.

7. A method as in claim 6 wherein said analyzing and shifting step further comprises:
   (x) determining the standard deviation of the distribution of densities represented by said digital signals;
   (y) shifting the densities between said mean density and a preset maximum density in accordance with a normal statistical distribution; and
   (z) shifting the densities between said mean density and a preset minimum density in accordance with said normal statistical distribution.

8. A method as in claim 4 wherein said merging step (f) includes introducing said digital graphic without substantial further processing and without scaling into a combined data stream comprising digital signals representing said text and further digital signals representing graphics.

9. A method as in claim 8 wherein:
   said converting step includes specifying a screen mesh value, image height value, image width value, and image sampling rate value; and
   said introducing step includes introducing said values specified by said specifying step.

10. A method as in claim 9 wherein said specifying step includes specifying a common image sampling rate value for both first and second dimensions of a two-dimensional image.

11. A method of printing text and images comprising:
   front end processing including the following steps (a)-(d):
   (a) providing an image;
   (b) providing text corresponding to said image;
   (c) converting said image to a digital graphic, including the steps of:
      (i) electronically defining a crop area corresponding to an area of said image,
      (ii) converting the portion of said image within said crop area to digital signals representing the density distribution of said image portion, and
      (iii) statistically analyzing said digital signals and shifting the density distribution represented by said digital signals in response to said statistical analysis, including the step of optimizing said shifting for a particular half-tone printing process; and
   (d) storing said shifted density digital signals in an image database for later retrieval; and
   (II) subsequent rendering processing including the following steps (e)-(g):
   (e) retrieving said stored shifted density digital signals from said image database;
   (f) electronically merging said text with said stored shifted density digital signals; and
   (g) printing said merged text and graphic represented by said stored shifted density digital signals using said particular half-tone printing process,
   wherein said analyzing and shifting step comprises:
      determining the mean density represented by said digital signals,
      shifting said mean density to a user-specified midtone value empirically optimized for said particular half-tone printing process,
      shifting the other densities represented by said signals in accordance with said midtone value,
      (x) determining the standard deviation of the distribution of densities represented by said digital signals,
      (y) shifting the densities between said mean density and a preset maximum density in accordance with a normal statistical distribution, and
      (z) shifting the densities between said mean density and a preset minimum density in accordance with said normal statistical distribution,
   wherein:
      said shifting step (y) includes mapping all densities greater than a 95th percentile density value determined in accordance with said standard deviation into the same maximum density value; and
      said shifting step (z) includes mapping all densities less than a 5th percentile density value determined in accordance with said standard deviation into the same minimum density value.

12. A system for printing text and images comprising:
   means for providing an image;
   means for providing text corresponding to said image;
   means for converting said image to a digital graphic, including:
      means for electronically defining a crop area corresponding to an area of said image,
      means for converting the portion of said image within said crop area to digital signals representing the density distribution of said image portion, and
      means for statistically analyzing said digital signals and shifting the density distribution represented by said digital signals in response to said statistical analysis, said shifting means including means for optimizing said shifted density distribution for a particular half-tone printing process;
   storing means coupled to said analyzing means for storing said shifted density digital signals in an image database and for subsequently retrieving said stored digital signals from said image database;
   means connected to said storing means for electronically merging said text with said digital graphic represented by said retrieved shifted density digital signals; and
   means connected to said merging means for printing said merged text and graphic using said particular half-tone printing process.

13. A system as in claim 12 wherein said analyzing and shifting means comprises:
   means for determining the mean density represented by said digital signals,
   means for setting said mean density to a user-specified midtone value optimized for said particular half-tone printing process; and
   means for shifting the other densities represented by said signals in accordance with said midtone value.

14. a system as in claim 13 wherein said analyzing and shifting means further comprises:

means for determining the standard deviation of the distribution of densities represented by said digital signals;

first shifting means for shifting the densities between said mean density and a certain maximum density in accordance with a normal statistical distribution; and second shifting means for shifting the densities between said means density and a certain minimum density in accordance with said normal statistical distribution.

15. A system as in claim 11 wherein said merging means includes means for introducing said digital graphic without substantial further processing and without scaling into a combined data stream comprising digital signals representing said text and further digital signals representing graphics.

16. A system as in claim 15 wherein:
said converting means includes means for specifying a screen mesh value, image height value, image width value, and image sampling rate value; and
said introducing means includes means for introducing said values specified by said specifying means.

17. A system as in claim 16 wherein said specifying means includes means for specifying a common image sampling rate value for both first and second dimensions of a two-dimensional image.

18. A system for printing text and images comprising:
means for providing an image;
means for providing text corresponding to said image;
means for converting said image to a digital graphic, including:
means for electronically defining a crop area corresponding to an area of said image,
means for converting the portion of said image within said crop area to digital signals representing the density distribution of said image portion, and
means for statistically analyzing said digital signals and shifting the density distribution represented by said digital signals in response to said statistical analysis, said shifting means including means for optimizing said shifted density distribution for a particular half-tone printing process;
storing means coupled to said analyzing means for storing said shifted density digital signals in an image database and for subsequently retrieving said stored digital signals from said image database;
means connected to said storing means for electronically merging said text with said digital graphic represented by said retrieved shifted density digital signals; and
means connected to said merging means for printing said merged text and graphic using said particular half-tone printing process,
wherein said analyzing and shifting means comprises:
means for determining the mean density represented by said digital signals,
means for setting said mean density to a user-specified midtone value optimized for said particular half-tone printing process,
means for shifting the other densities represented by said signals in accordance with said midtone value,
means for determining the standard deviation of the distribution of densities represented by said digital signals, first shifting means for shifting the densities between said mean density and a certain maximum density in accordance with a normal statistical distribution; and second shifting means for shifting the densities between said mean density and a certain minimum density in accordance with said normal statistical distribution, wherein:
said first shifting means includes means for mapping all densities greater than a 95th percentile density valve determined in accordance with said standard deviation into the same maximum density valve; and said second shifting means includes means for mapping all densities less than a 5th percentile density value determined in accordance with said standard deviation into the same minimum density value.

19. A process for producing a printed article comprising the following steps:
(a) digitizing an image to thereby provide a contone data set representing said image;
(b) enhancing said contone data set to provide an enhanced contone data set;
(c) storing said enhanced contone data set within an image database, including the step of associating said stored data set with a unique designator;
(d) repeating said steps (a)–(c) to provide said image database of stored enhanced contone data sets having designators associated therewith;
(e) providing a plurality of blocks of textual information and associated designators;
(f) retrieving and merging said stored enhanced contone data sets with said blocks of textual information, including the step of matching designators corresponding to said blocks of textual information with designators associated with said stored data sets;
(g) converting said merged textual information blocks and data sets into half-tone representations; and
(h) rendering said half-tone representations on printing media,
wherein at least one of said converting step (g) and said rendering step (h) includes the step of affecting print quality in response to a print quality factor, and said enhancing step (b) includes the step of optimizing said enhanced contone data set beforehand in response to said print quality factor, and
wherein said affecting step includes the step of increasing the size of half-tone dots beyond nominal half-tone dot sizes, and said optimizing step includes the step of shifting pixel levels within said enhanced contone data set so as to compensate for said half-tone dot size increase.

20. A process as in claim 19 wherein:
said designators comprise real estate multiple listing numbers; and
said process includes the preliminary step of photographing images of real estate properties.

21. A process for preparing multiple listing service books including the following steps:
photographing an image of a real estate property offered for sale;
inputting textual information relating to said real estate property into a multiple listing service data processing system;
assigning a multiple listing number to said real estate property;

digitizing said photographed image to thereby provide a contone data set representing said image;

enhancing said contone data set to provide an enhanced contone data set;

inputting said assigned multiple listing number;

storing said enhanced contone data set in association with said inputted multiple listing number;

obtaining said inputted textual information and associated multiple listing number from said multiple listing service data processing system;

retrieving said stored enhanced contone data set in response to said multiple listing number;

merging said stored enhanced contone data set with said obtained textual information and converting said merged data set and textual information into half-tone representations; and rendering said half-tone representations on printing media, wherein at least one of said converting step and said rendering step includes the step of affecting print quality in response to a print quality factor, and said enhancing step includes the step of optimizing said enhanced contone data set beforehand in response to said print quality factor by shifting pixel levels within said enhanced contone data set so as to compensate for half-tone dot size increase.

22. A method of printing real estate advertising listings for multiple real estate properties, said printed listings including images of real estate properties and text associated with said real estate properties, said method including the following steps:

(a) capturing, in a digital data form, an image of a real estate property;

(b) optimizing said digital data for a particular printing process to provide optimized digital data such that the image can be printed at high quality in response to said optimized digital data using said particular printing process without the necessity for significant further print image quality related post-processing, said optimizing step including the following steps:

deriving and statistically analyzing a density distribution for at least a portion of said image in response to said captured digital data, and shifting the density of the captured digital data in response to said statistical analysis so as to provide digital data optimized for said particular printing process;

(c) storing said optimized digital data in an electronic library of real estate property image data so optimized;

(d) providing text in electronic form; (e) retrieving optimized image data from said library in response to said provided text, and electronically merging said retrieved image data with said text; and (f) printing said advertising listings in response to said merged text and image data using said particular printing process.

23. A method as in claim 22 wherein:

said storing step includes the step of assigning an identification to each of said images;

said providing step (d) includes the step of specifying image identifications associated with provided text; and said retrieving step selects and retrieves image data in response to said image identifications associated with said text.

24. A method as in claim 22 wherein said steps (d)-(f) are subsequently repeated with different provided text, and said merging step selects only a subset of the image data in said image library.

25. A method as in claim 22 wherein said optimizing step includes the step of displaying said image, and adjusting said digital data in a manner which degrades the displayed image but optimized the digital data for rendering using said particular printing process.

26. A method as in claim 22 wherein said digital data comprises continuous tone data, and said particular printing process renders said image using half-tone rendering.

27. A method as in claim 22 wherein said image data in said electronic library is optimized for said particular printing process on an image-by-image basis.

28. A method as in claim 22 wherein said printing step includes generating print masters of said text and images using a conventional electronic typesetter by applying a conversion process common to image data corresponding to each of several images.

* * * * *